US011565318B2

(12) United States Patent
Rios et al.

(10) Patent No.: US 11,565,318 B2
(45) Date of Patent: Jan. 31, 2023

(54) REACTIVE MATRIX INFILTRATION OF POWDER PREFORMS

(71) Applicants: Orlando Rios, Knoxville, TN (US); Craig A. Bridges, Knoxville, TN (US); Amelia M. Elliott, Knoxville, TN (US); Hunter B. Henderson, Livermore, CA (US); Michael S. Kesler, Knoxville, TN (US); Zachary Sims, Knoxville, TN (US); David Weiss, Manitowoc, WI (US)

(72) Inventors: Orlando Rios, Knoxville, TN (US); Craig A. Bridges, Knoxville, TN (US); Amelia M. Elliott, Knoxville, TN (US); Hunter B. Henderson, Livermore, CA (US); Michael S. Kesler, Knoxville, TN (US); Zachary Sims, Knoxville, TN (US); David Weiss, Manitowoc, WI (US)

(73) Assignees: UT-Battelle, LLC, Oak Ridge, TN (US); University of Tennessee Research Foundation, Knoxville, TN (US); Eck Industries Incorporated, Manitowoc, WI (US)

( * ) Notice: Subject to any disclaimer, the term of this patent is extended or adjusted under 35 U.S.C. 154(b) by 138 days.

(21) Appl. No.: 17/011,316

(22) Filed: Sep. 3, 2020

(65) Prior Publication Data
US 2021/0060652 A1 Mar. 4, 2021

Related U.S. Application Data

(60) Provisional application No. 62/895,003, filed on Sep. 3, 2019.

(51) Int. Cl.
B22F 7/08 (2006.01)
C22C 21/00 (2006.01)
(Continued)

(52) U.S. Cl.
CPC .............. B22F 7/08 (2013.01); B22F 3/26 (2013.01); C22C 14/00 (2013.01); C22C 21/00 (2013.01); B22F 2301/205 (2013.01)

(58) Field of Classification Search
None
See application file for complete search history.

(56) References Cited

U.S. PATENT DOCUMENTS 5,224,533 A  7/1993 Kantner et al.
5,509,555 A  4/1996 Chiang et al.
(Continued)

FOREIGN PATENT DOCUMENTS

DE   102011012142 B3 *  1/2012  .......... C22C 1/1036
EP      1 525 330 B1       7/2003
WO   WO 2017/007908 A1    1/2017

OTHER PUBLICATIONS

Arslan et al., "Quantitative X-ray diffraction analysis of reactive infiltrated boron carbide-aluminium composites," *Journal of the European Ceramic Society*, 2003, 23:1243-1255.

(Continued)

*Primary Examiner* — Xiaobei Wang
(74) *Attorney, Agent, or Firm* — Klarquist Sparkman, LLP

(57) ABSTRACT

A reactive matrix infiltration process is described herein, which includes contacting a surface of a preform comprising reinforcement material particles with a molten infiltrant comprising a matrix material, the matrix material comprising an Al—Ce alloy, whereby the infiltrant at least partially fills spaces between the reinforcement material particles by capillary action and reacts with the reinforcement material particles to form a composite material form, the composite material comprising the matrix material, at least one intermetallic phase, and, optionally, reinforcement material particles. A composite material form also is described, which (Continued)

includes a plurality of reinforcement material particles comprising a metal alloy or a ceramic, a matrix material at least partially filling spaces between the reinforcement material particles; and at least one intermetallic phase surrounding at least some of the reinforcement material particles. The reinforcement material particles and intermetallic phase together may form a gradient core-shell structure.

24 Claims, 21 Drawing Sheets

(51) Int. Cl.
  *C22C 14/00* (2006.01)
  *B22F 3/26* (2006.01)

(56) References Cited

U.S. PATENT DOCUMENTS

| | | | |
|---|---|---|---|
| 10,760,148 B2 | 9/2020 | Plotkowski et al. | |
| 2009/0263277 A1* | 10/2009 | Pandey | C22F 1/04 |
| | | | 420/580 |
| 2011/0142710 A1* | 6/2011 | Kondoh | C22F 1/02 |
| | | | 420/407 |
| 2018/0237893 A1 | 8/2018 | Rios et al. | |
| 2019/0085431 A1 | 3/2019 | Rios et al. | |
| 2019/0169725 A1* | 6/2019 | Rios | C22C 47/04 |

OTHER PUBLICATIONS

Dobrzański et al., "Composite Materials Infiltrated by Aluminium Alloys Based on Porous Skeletons from Alumina, Mullite and Titanium Produced by Powder Metallurgy Techniques," *Powder Metallurgy—Fundamentals and Case Studies 2017*, Chapter 5, pp. 95-137, published by InTech, Croatia.

Sims et al., "High Performance Aluminum-Cerium Alloys for High-Temperature Applications," accepted manuscript, 12 pages, published in *Materials Horizons*, Aug. 1, 2017, vol. 6.

Yadav et al., "Binder Jetting 3D Printing of Titanium Aluminides Based Materials: A Feasibility Study," *Adv. Eng. Mater.*, May 15, 2020, 2000408, 7 pages.

Yu et al., "Effect of Ti Addition on the Microstructure and Mechanical Properties of SiC Matrix Composites Infiltrated by Al—Si (10 wt.%)—xTi Alloy," *Materials*, Jan. 21, 2019, 12, 318, 12 pages.

\* cited by examiner

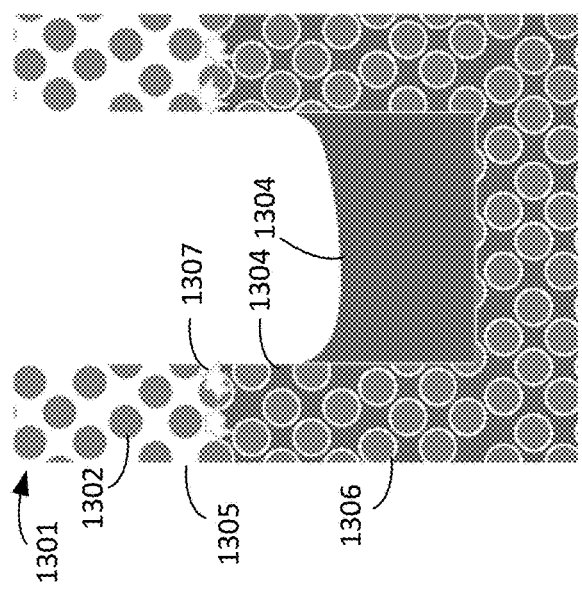
FIG. 13
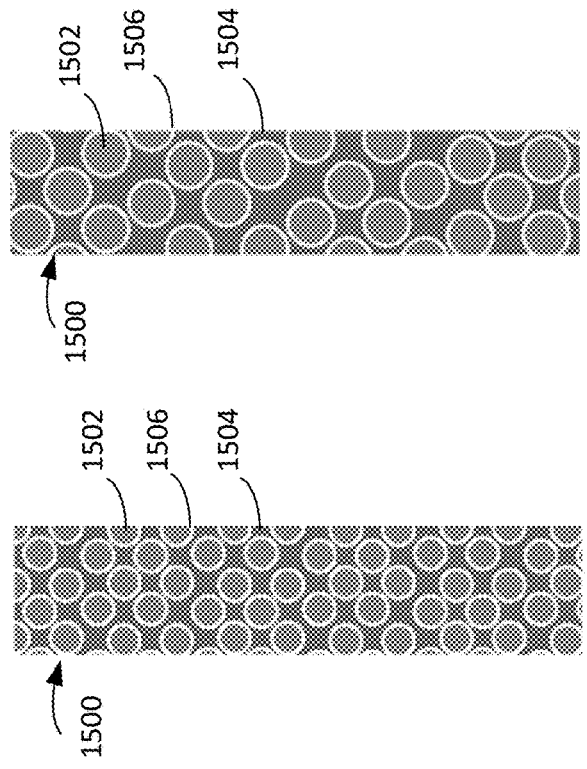
FIG. 15A
FIG. 15B
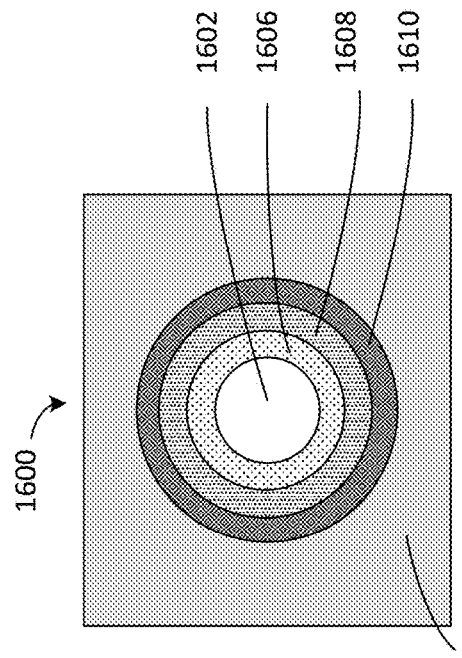
FIG. 16
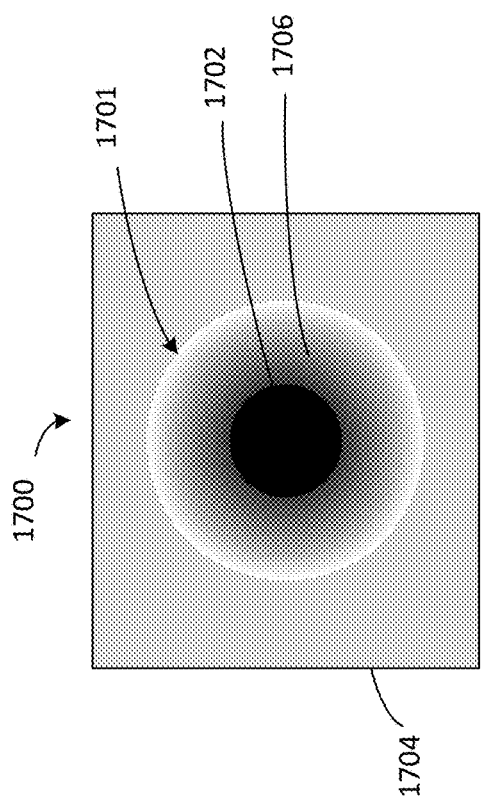
FIG. 17

REACTIVE MATRIX INFILTRATION OF POWDER PREFORMS

CROSS REFERENCE TO RELATED APPLICATION

This application claims the benefit of the earlier filing date of U.S. Provisional Application No. 62/895,003, filed Sep. 3, 2019, which is incorporated by reference herein in its entirety.

ACKNOWLEDGMENT OF GOVERNMENT SUPPORT

This invention was made with government support under Contract No. DE-AC05-00OR22725 awarded by the United States Department of Energy. The government has certain rights in the invention.

FIELD

This disclosure concerns methods for reactive matrix infiltration of powder preforms and composite material forms made by the method.

BACKGROUND

Powder preform parts may be manufactured through an additive manufacturing technique such as binder jetting, slurry vat photopolymerization, or slurry extrusion or traditional powder processing techniques such as die pressing or powder injection molding. The binder jet technique forms layered builds through depositing a liquid binder onto a flat powder bed layer by layer loosely bonding the powder together into the desired shape. At least one disadvantage to these additive manufacturing processes is that the final step in such processes —that is, binder burn-off and powder sintering—leads to less geometrically accurate parts compared to parts produced by powder bed fusion additive manufacturing techniques. In other words, shrinkage of the sintered parts can be anywhere from 20-40% and is often uneven and unpredictable. Processes that can avoid these drawbacks and provide parts with lower or no distortion and suitable mechanical strength are needed in the art.

SUMMARY

This disclosure concerns methods for reactive matrix infiltration of powder preforms and composite material forms made by the method. In some embodiments, a method for reactive matrix infiltration of powder preforms includes contacting a surface of a preform comprising reinforcement material particles having an initial average diameter with a molten infiltrant at a temperature $T_1$, wherein $T_1$ is greater than a melting point of the molten infiltrant and less than a melting point of the reinforcement material particles, the molten infiltrant comprising an aluminum-cerium (Al—Ce) alloy and the reinforcement material particles comprising a metal alloy or a ceramic, whereby the molten infiltrant at least partially fills spaces between the reinforcement material particles by capillary action and reacts with the reinforcement material particles to form a composite material form, the composite material form comprising a matrix material comprising the Al—Ce alloy and at least one intermetallic phase comprising at least one element of the reinforcement material particles, Al, and Ce; and cooling the composite material form to a temperature $T_2$ less than a melting point of the molten infiltrant. In some embodiments, the composite material form further comprises reinforcement material particles having a final average diameter, wherein the final average diameter is less than the initial average diameter. In any of the foregoing or following embodiments, the preform may be maintained at a temperature greater than the melting point of the molten infiltrant while contacting the surface of the preform with the molten infiltrant. In any of the foregoing or following embodiments, the Al—Ce alloy may comprise from 5 wt % to 20 wt % Ce with the balance being Al.

In any of the foregoing or following embodiments, the preform may be a bonded powder preform comprising the reinforcement material particles and a binder, and the method further includes heating the bonded powder preform to a temperature $T_3$, wherein $T_3$ is effective to decompose the binder and $T_3$ is less than a melting point of the reinforcement material particles and less than a melting point of the molten infiltrant, thereby decomposing the binder and producing the preform, the preform having spaces between the reinforcement material particles; and subsequently contacting the surface of the preform with molten infiltrant at the temperature $T_1$. In some embodiments, the method further includes comprising forming the preform using binder jet technology.

In any of the foregoing or following embodiments, contacting the surface of the preform with the molten infiltrant may comprise dipping the surface of the preform into the molten infiltrant. In any of the foregoing or following embodiments, the method may further include subsequently heating the composite material form to a temperature $T_4$, whereby the matrix material reacts further with the reinforcement material particles to form additional intermetallic.

In any of the foregoing or following embodiments, the reinforcement material particles may constitute ≥50% (v/v) of the preform. In some embodiments, wherein the reinforcement material particles of the preform have (i) an average diameter within a range of from 20 μm to 250 μm; or (ii) an aspect ratio within a range of from 1 to 10; or (iii) both (i) and (ii). In any of the foregoing or following embodiments, the reinforcement material particles may comprise a metal alloy. In some embodiments, the metal alloy comprises a titanium alloy, a nickel alloy, a copper alloy, an iron alloy, steel, an aluminum alloy, a high-entropy alloy, or any combination thereof. In certain embodiments, the metal alloy is a Ti—Al—V alloy.

In some embodiments, the reinforcement material particles comprise a first metal M1, and the composite material form comprises one or more gradient core-shell structures. The gradient core-shell structure may comprise a gradient core comprising M1, Al, and Ce, and a plurality of intermetallic phases, the gradient core having a compositional gradient with a first average M1 concentration and a first average Ce concentration at a first average distance from a center of the gradient core, a second average M1 concentration and a second average Ce concentration at a second, further average distance from the center, wherein the second average M1 concentration is less than the first average M1 concentration; and a shell surrounding the gradient core, the shell comprising an average Ce concentration at least 5-fold greater than the second average Ce concentration.

In some embodiments, a method for reactive matrix infiltration of powder preforms includes contacting a binder jet preform comprising reinforcement material particles and a binder with an infiltrant comprising an Al—Ce alloy, the reinforcement material particles comprising a metal alloy; heating the binder jet preform, optionally under a non-reactive gas, to a temperature greater than a decomposition temperature of the binder, wherein the temperature is less than a melting point of the infiltrant, thereby decomposing the binder and producing a preform having spaces between the reinforcement material particles; increasing the temperature to a temperature greater than a melting point of the infiltrant, whereby the infiltrant fills the spaces between the reinforcement material particles by capillary action and reacts with the reinforcement material particles to produce a form; and cooling the form to a temperature less than a melting point of the infiltrant. In certain examples, the reinforcement material comprises a Ti—Al—V alloy. The method may further include subsequently heating the form to an effective temperature for reaction of the infiltrant with the reinforcement material particles.

Some embodiments of a composite material form made by the disclosed methods comprises a plurality of reinforcement material particles comprising a metal alloy or a ceramic; a matrix material at least partially filling spaces between the reinforcement material particles, the matrix material comprising Al and Ce; and at least one intermetallic phase surrounding one or more of the reinforcement material particles, the intermetallic phase including one or more elements of the reinforcement material particles, Al, and Ce. In certain embodiments, the reinforcement material comprises a Ti—Al—V alloy.

In any of the foregoing embodiments, the reinforcement material may comprise a first metal M1, and the reinforcement material particles and the intermetallic phase together comprise a gradient core-shell structure comprising a gradient core comprising M1, Al, and Ce, and a plurality of intermetallic phases, the gradient core having a compositional gradient with a first average M1 concentration and a first average Ce concentration at a first average distance from a center of the gradient core, a second average M1 concentration and a second average Ce concentration at a second, further average distance from the center, wherein the second average M1 concentration is less than the first average M1 concentration; and a shell surrounding the gradient core, the shell comprising an average Ce concentration at least 5-fold greater than the second average Ce concentration. In some embodiments, M1 comprises Ti.

The foregoing and other objects and features of the present disclosure will become more apparent from the following detailed description, which proceeds with reference to the accompanying figures.

BRIEF DESCRIPTION OF THE DRAWINGS

FIG. 13 is a graphical representation of a reactive matrix infiltration process wherein reaction products block pathways for further infiltration.

FIGS. 15A and 15B are schematic cross-sectional graphical representations of a portion of a form produced by a reactive matrix infiltration process using small reinforcement material particles (15A) or large reinforcement material particles (15B).

FIG. 16 is an expanded schematic cross-sectional graphical representation of a portion of a form produced by a reactive matrix infiltration process, including a plurality of intermetallic phase layers around a reinforcement material particle.

FIG. 17 is an expanded schematic cross-sectional graphical representation of a portion of a form produced by a reactive matrix infiltration process, including a gradient composition intermetallic phase layer around a reinforcement material particle.

DETAILED DESCRIPTION

Figure 1:
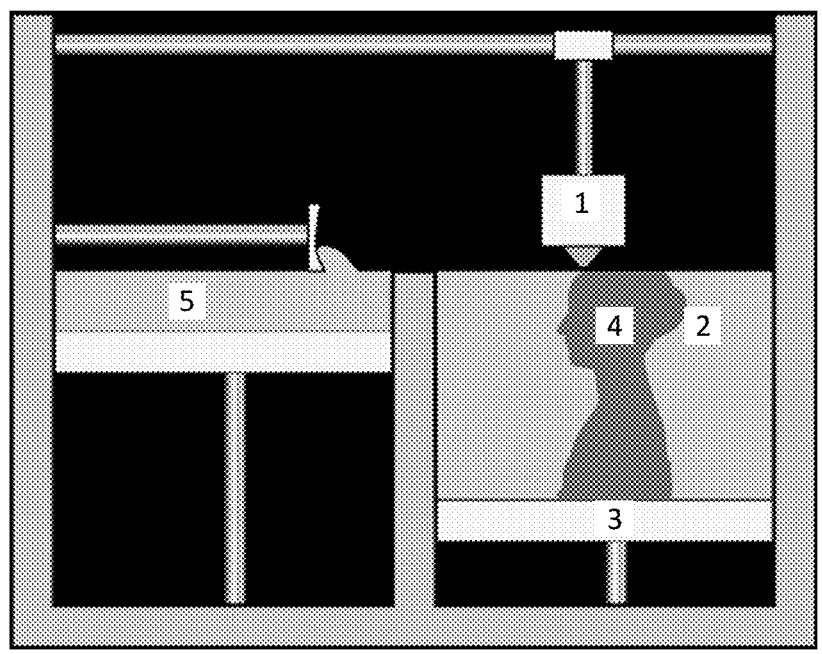
FIG. 1 is a schematic representation of an exemplary binder jet process.

Embodiments of a method for reactive matrix infiltration of a powder preform are disclosed. Composite material forms made by the method also are disclosed. In some embodiments, the reactive matrix material is an aluminum-cerium alloy. The powder preform comprises reinforcement material particles. The reinforcement material may be a metal alloy or a ceramic.

I. Explanation of Terms

The following explanations of terms are provided to better describe the present disclosure and to guide those of ordinary skill in the art in the practice of the present disclosure. As used herein, "comprising" means "including" and the singular forms "a" or "an" or "the" include plural references unless the context clearly dictates otherwise. The term "or" refers to a single element of stated alternative elements or a combination of two or more elements, unless the context clearly indicates otherwise.

Unless explained otherwise, all technical and scientific terms used herein have the same meaning as commonly understood to one of ordinary skill in the art to which this disclosure belongs. Although methods and compounds similar or equivalent to those described herein can be used in the practice or testing of the present disclosure, suitable methods and compounds are described below. The compounds, methods, and examples are illustrative only and not intended to be limiting, unless otherwise indicated. Other features of the disclosure are apparent from the following detailed description and the claims.

Unless otherwise indicated, all numbers expressing quantities of components, molecular weights, percentages, temperatures, times, and so forth, as used in the specification or claims are to be understood as being modified by the term "about." Accordingly, unless otherwise indicated, implicitly or explicitly, the numerical parameters set forth are approximations that can depend on the desired properties sought and/or limits of detection under standard test conditions/methods. When directly and explicitly distinguishing embodiments from discussed prior art, the embodiment numbers are not approximates unless the word "about" is recited. Furthermore, not all alternatives recited herein are equivalents.

The following terms and definitions are provided:

Alloy: A metal made by melting and mixing two or more different metals. For example, an aluminum alloy is a metal made by combining aluminum and at least one other metal. In some instances, an alloy is a solid solution of metal elements.

Carbon steel: An alloy comprising iron and carbon (typically 0.04-2.5 wt %). Carbon steel alloys may further include manganese (up to 1.65 wt %), silicon (up to 0.6 wt %), copper (up to 0.6 wt %), or combinations thereof.

Ceramic: An inorganic oxide, nitride, or carbide. The ceramic may have a crystalline structure.

Composite material: As used herein, the term "composite material" refers to a material produced by reactive matrix infiltration, the composite material comprising at least one intermetallic phase and a matrix material, or a plurality of intermetallic phases. The composite material further may include a reinforcement material.

Form: As used herein, the term "form" refers to an object manufactured from particles of a reinforcement material and a matrix material infiltrated into spaces between the reinforcement material particles. A preform comprises particles of a reinforcement material with a binder occupying spaces between the reinforcement material particles. The binder subsequently is removed from the preform, leaving open spaces between the reinforcement particles.

Intermetallic (or Intermetallic Phase): A solid-state compound containing two or more metallic elements and exhibiting metallic bonding, defined stoichiometry and/or ordered crystal structure, optionally with one or more non-metallic elements. In some instances, an alloy may include regions of a single metal and regions of an intermetallic phase. In an exemplary binary alloy comprising aluminum and a rare earth element X, where X is Ce, the intermetallic phase may have a formula $Al_{11}Ce_3$.

Matrix material: A material that at least partially fills spaces between a plurality of particles in a form. The matrix material may be a reactive matrix material, wherein one or more components within the matrix material reacts with one or more components of the form particle under effective conditions, e.g., a temperature sufficient to induce the reaction.

Powder: A composition comprising dispersed solid particles that are relatively free flowing from one another and a gas (e.g., air, argon, nitrogen, oxygen, sulfur hexafluoride). As defined herein, a powder may comprise particles having an average diameter less than 1 mm. In some embodiments, the average diameter is ≤250 μm. As used herein, average diameter means the mathematical average diameter of a plurality of powder particles.

Reinforcement material: As used herein, the term "reinforcement material" refers to a metal alloy or ceramic, typically provided in powder form, and used in combination with a binder to manufacture a preform.

Stainless steel: An alloy comprising iron and chromium. Stainless steel alloys typically also include at least trace amounts of one or more other elements including, but not limited to, carbon, nickel, manganese, molybdenum, silicon, phosphorus, nitrogen, sulfur, aluminum, arsenic, antimony, bismuth, cobalt, copper, niobium, selenium, tantalum, titanium, tungsten, vanadium, or combinations thereof.

II. Introduction

In one exemplary process (FIG. 1), a moving head (1) selectively binds the surfaces of a powder bed (2) by depositing a chemical binder. A moving platform (3) progressively lowers the powder bed and the solidified object (4) rests inside the unbound powder. New powder is continually added to the bed from a powder reservoir (5), e.g., by a leveling mechanism. After printing is complete the loose powder and part are separated, mechanical agitation being one commonly used method for powder part separation. Following separation, parts are often sintered to burn out the binder and increase structural rigidity through particle-particle bonding. The binder burn-off and powder sintering, however, leads to parts with high porosity and lower mechanical strength compared to parts produced by other additive manufacturing techniques.

It is possible to increase the mechanical properties and reduce shrinkage of parts produced using binder jetting through infiltration with another lower melting temperature matrix material. The infiltration method relies on wetting particle surfaces with a molten material in contact with binder jet part. Utilizing capillary forces, the infiltrant material is able to wick through the interconnected porosity remaining in the part produced with binder jet technology. The infiltrant material is then allowed to solidify, acting as support for the particle-particle bond necks and increasing mechanical strength. Similar to ceramic preform infiltration for the production of composite materials, this method leads to a distribution of particles in a dissimilar matrix. The baseline infiltration method is limited, however, by the particle interfaces and often only sees marginal increases in strength as the matrix only acts to support particle interactions and does not behave as expected of matrix materials in a composite material.

This disclosure concerns embodiments of a method for producing composite material forms via reactive matrix infiltration. Advantageously, forms produced by the disclosed method may have decreased porosity and/or increased mechanical strength compared to forms manufactured by infiltrating a powder preform with a non-reactive matrix material. In some embodiments, the composite material form has increased mechanical strength at both ambient and elevated temperatures, making the forms suitable for use in high-temperature environments.

III. Reactive Matrix Infiltration

Embodiments of a method for producing composite material forms via reactive matrix infiltration are disclosed. Parts manufactured with the composite material forms are useful across a range of industries and application environments, including high-temperature environments.

Figure 3:
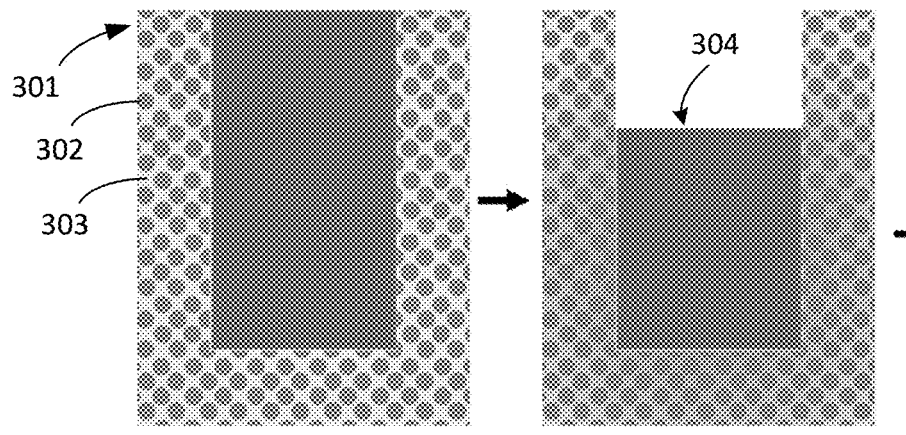
FIG. 3 is a graphical representation of the conventional, non-reactive matrix infiltration process shown by FIG. 2.
Figure 3:
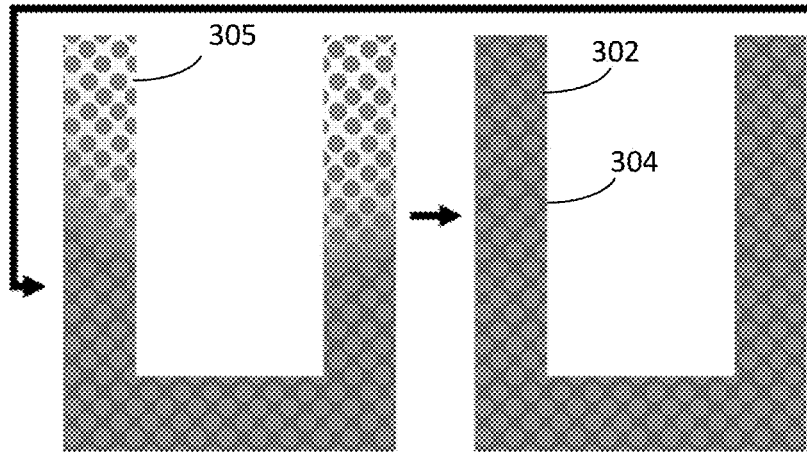
Figure 2:
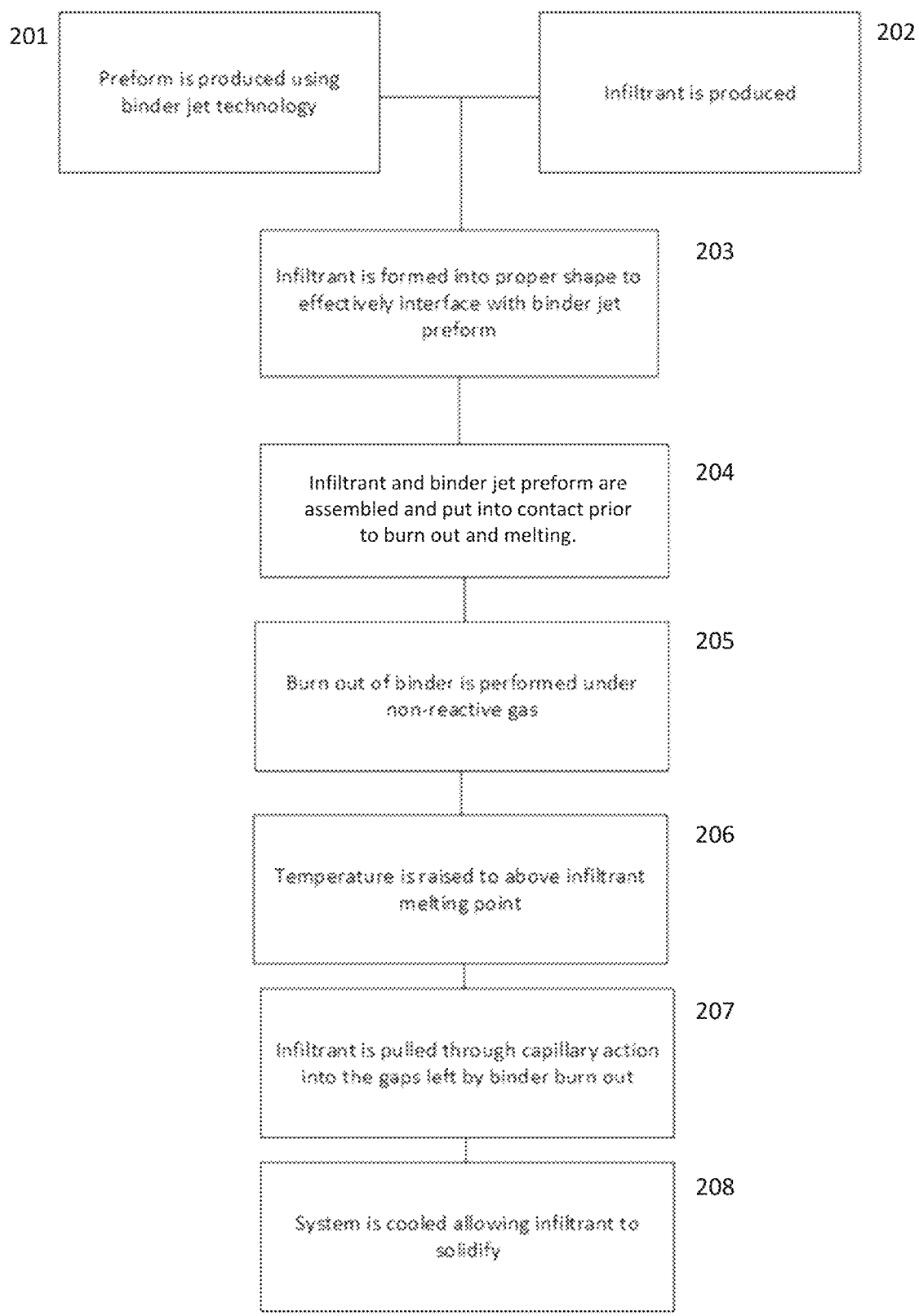
FIG. 2 is a flow diagram of a conventional, non-reactive matrix infiltration process.

An exemplary flow diagram of a conventional, non-reactive infiltration process can be seen in FIG. 2, and a graphical representation of the infiltration process is shown in FIG. 3. With reference to FIG. 2, a binder jet preform and a non-reactive infiltrant are produced (steps 201 and 202, respectively). The infiltrant is formed into a shape to interface with the binder jet preform (step 203). Where the infiltrant is, for example, a plurality of particles (e.g., powder particles, granules, chips, or the like), forming the infiltrant into a shape may be optional. The infiltrant and binder jet preform are assembled and put into contact (step 204). Burn out of the binder is performed under a non-reactive gas (step 205). The temperature is then raised to above the infiltrant melting point (step 206). The infiltrant is pulled through capillary action into the gaps between the particles and those left by binder burn-out (step 207). The system is then cooled, allowing the infiltrant to solidify (step 208). As seen in FIG. 3, a preform 301 comprises a plurality of reinforcement material particles 302 and a binder 303. Although the schematic diagram of FIG. 3 indicates that binder 303 fills all spaces between the reinforcement material particles 302, a person of ordinary skill in the art of binder jet manufacturing understands that the binder 303 may not occupy all spaces between the particles 302. In some embodiments, the binder 303 is primarily located at the neck junctions between particles 302 and the preform 301 may include gaps that are not occupied by the binder 303. An infiltrant 304 is placed in the preform 301. The preform 301 and infiltrant 304 are heated to burn out the binder 303, producing gaps 305, and melting the infiltrant 304, which fills the gaps 305 between the particles and left by the binder burnout. The reinforcement material particles 302 remain unreacted and the gaps 305 are simply filled with the infiltrant 304. There is no reaction between the powder particles 302 and the infiltrant 304.

In contrast, embodiments of the disclosed method rely on infiltration of a reactive matrix. A reactive matrix is a matrix material that reacts with the powder particles of the preform to produce a form comprising a composite material, the composite material comprising at least one intermetallic phase and the matrix material, or a plurality of intermetallic phases. The composite material further may comprise a reinforcement material.

In some embodiments, the reactive matrix material comprises an Al—Ce alloy. The alloy may be a binary Al—Ce alloy or a ternary Al—Ce alloy further comprising a third component. For example, the alloy may be an Al—Ce—Mg alloy, an Al—Ce—Si alloy, or an Al—Ce—Cu alloy, among others. In certain embodiments, the reactive matrix material consists of, or consists essentially of, the Al—Ce alloy. By "consists essentially of" is meant that the reactive matrix material contains no more than trace amounts (less than 1 wt %) of any impurities. Thus, if the reactive matrix material consists essentially of an Al—Ce—Mg alloy, for example, the reactive matrix material contains no more than trace amounts of components other than Al, Ce, or Mg. A binary Al—Ce alloy may consist of, or consist essentially of, aluminum and cerium. By "consists essentially of" is meant that the aluminum cerium alloy contains no more than trace amounts (less than 1 wt %) of any elements other than aluminum and cerium. In any of the foregoing or following embodiments, the Al—Ce alloy may comprise from 5 wt % to 20 wt % Ce, such as from 6-16 wt %, or 10-16 wt % Ce, with aluminum comprising the balance of the alloy. In some examples, the Al—Ce is an Al-12Ce alloy. With reference to alloys, the numbers in the formula refer to an approximate wt % of the elements. Thus, an Al-12Ce alloy includes approximately 12 wt % Ce with the balance being Al.

The reactive matrix material is infiltrated into a preform comprising a reinforcement material. The reinforcement material may be a metal alloy or a ceramic and has a higher melting point than the infiltrant. In some embodiments, the melting point of the reinforcement material is at least at least 50° C., at least 100° C., or at least 250° C. higher than the melting point of the matrix material. For example, the reinforcement material melting point may be 50-1000° C., 100-1000° C., or 250-1000° C. higher than the matrix material melting point. Suitable metal alloys include, but are not limited to, titanium alloys, nickel alloys (e.g., Inconel® nickel-chromium alloys), copper alloys (e.g., bronze), iron alloys, steels (e.g., carbon steel, stainless steel—such as 300, 400, 600, and 2000 series), aluminum alloys, high-entropy alloys (alloys including five or more elements in equal or similar proportions), and combinations thereof. In some embodiments, the metal alloy is a titanium alloy. In certain embodiments, the titanium alloy is a Ti—Al—V alloy, such as Ti-6Al-4V (also known as Ti6Al4V or simply Ti64). Ti-6Al-4V has a density of roughly 4420 kg/m$^3$, a Young's modulus of 120 GPa, and tensile strength of 1000 MPa. Suitable ceramics include, but are not limited to, titania, alumina, aluminum nitride, silicon carbide, silicon nitride, boron carbide, boron nitride, and combinations thereof.

The preform initially is produced from the reinforcement material and a binder. The reinforcement material may be provided as a powder. In some embodiments, the powder comprises particles having (i) an average diameter within a range of from 20 μm to 250 μm, (ii) an aspect ratio within a range of from 1 to 10, or (iii) both (i) and (ii). In certain embodiments, the particles are spherical or spheroid. In any of the foregoing or following embodiments, the reinforcement material particles may constitute ≥50% (v/v) of the preform with the balance being the binder. In some embodiments, the reinforcement material particles constitute 60-80% (v/v) of the preform. The binder may be any suitable material having a melting point and/or a decomposition temperature less than a melting point of the reinforcement material. In some embodiments, the binder has a melting point and/or a decomposition temperature less than a melting point of the matrix material. In certain embodiments, the binder comprises a resin, a wax, a long-chain fatty acid, naphthalene, carbon-based, silicon-based, or any combination thereof.

In any of the foregoing or following embodiments, the preform may be produced by any suitable method. In some embodiments, the preform is made by a binder jet technique as previously described and illustrated in FIG. 1. In other embodiments, the preform is made by extrusion of powder-loaded wax, metal-injection molding, vat polymerization, metal/material jetting, or traditional powder metallurgy techniques.

Figure 4:
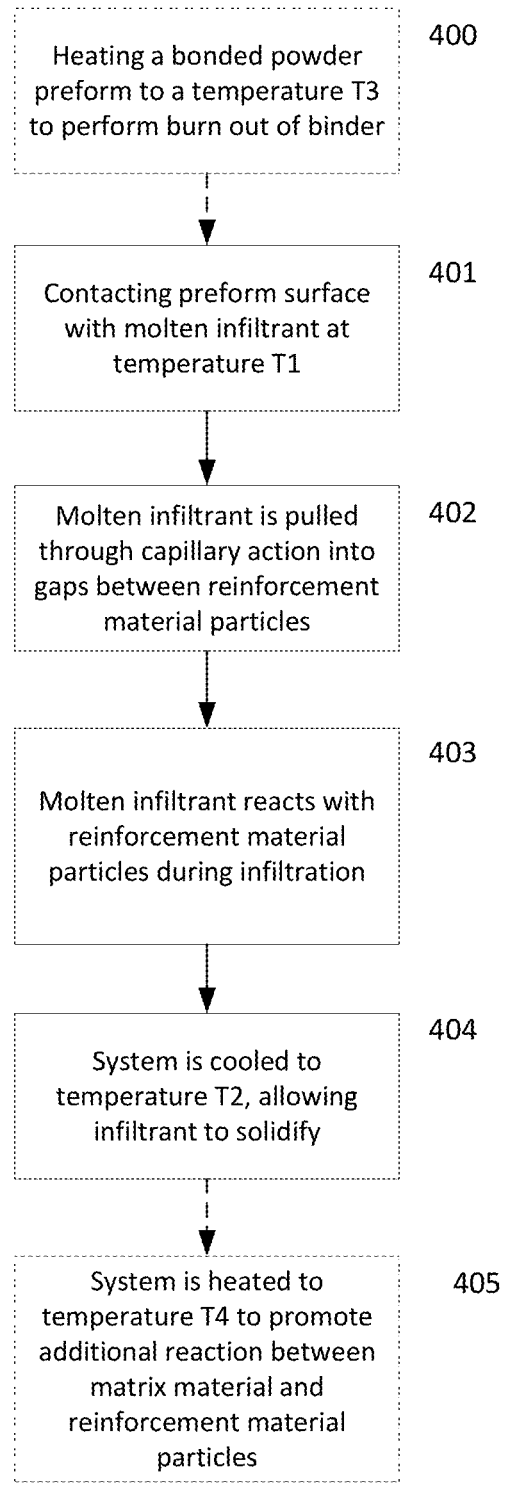
FIG. 4 is a flow diagram of one embodiment of a reactive matrix infiltration process according to the present disclosure.

In some embodiments (see, e.g., FIG. 4), the method includes contacting a surface of a preform comprising reinforcement material particles with a molten infiltrant at a temperature $T_1$ (step 401). $T_1$ is greater than a melting point of the molten infiltrant and less than a melting point of the reinforcement material particles. The infiltrant comprises an aluminum-cerium (Al—Ce) alloy, and the reinforcement material comprises a metal alloy or a ceramic. The molten infiltrant at least partially fills spaces between the reinforcement material particles by capillary action (step 402) and reacts with the reinforcement material particles to form a composite material comprising the reinforcement material particles, the matrix material, and at least one intermetallic phase comprising at least one element of the reinforcement material particles, Al, and Ce (step 403); and cooling the composite material to a temperature $T_2$ less than a melting point of the infiltrant (step 404) to produce a form. In some embodiments, the preform may be maintained at a temperature greater than the infiltrant melting point while contacting the surface of the preform with the molten infiltrant. For example, the preform may be maintained at a temperature within a range of from greater than the infiltrant melting point to $T_1$. In any of the foregoing or following embodiments, the process may be performed at atmospheric pressure or at an increased pressure. In some embodiments, the process is performed at atmospheric pressure.

In certain embodiments, the preform is a bonded powder preform comprising the reinforcement material particles and a binder, and the process further includes heating the bonded powder preform (with or without a non-reactive cover gas) to a temperature $T_3$ (step 400), wherein $T_3$ is effective to melt or decompose the binder and $T_3$ is less than a melting point of the reinforcement material particles and less than a melting point of the infiltrant, thereby decomposing the binder and producing the preform, the preform having spaces between the reinforcement material particles, and subsequently contacting the surface of the preform with the molten infiltrant at $T_1$. In any of the foregoing or following embodiments, the method may further include heating the composite material form to a temperature $T_4$ to induce further reaction between the matrix material and the reinforcement material particles (step 405). Table 1 shows exemplary metal alloy reinforcement materials and potential intermetallic phase components resulting from reaction of the reinforcement material with the Al—Ce alloy.

TABLE 1

| Reinforcement Material | Potential Intermetallic Phase Components |
|---|---|
| Fe and its alloys | Al + Fe + (Al, Ce) + (Al, Fe) + (Al, Ce, Fe) + (Additional IMC*) + (Al, Ce, Fe mixed) |
| Ti and its alloys | Al + Ti + (Al, Ce) + (Al, Ti) + (Al, Ce, Ti) + (Additional IMC*) + (Al, Ce, Ti mixed) |
| Stainless steel | Al + SS + (Al, Ce) + (Al, SS) + (Al, Ce, SS) + (Additional IMC*) + (Al, Ce, SS mixed) |
| Cu and its alloys | Al + Cu + (Al, Ce) + (Al, Cu) + (Al, Ce, Cu) + (Additional IMC*) + (Al, Ce, Cu mixed) |
| Ni and its alloys | Al + Ni + (Al, Ce) + (Al, Ni) + (Al, Ce, Ni) + (Additional IMC*) + (Al, Ce, Ni mixed) |
| Al and its alloys | Al + (Al, Ce) + Additional IMC*) + (Al, Ce, mixed metalloceramic compounds) |
| High entropy alloys | Al + HEA + (Al, Ce) + (Al, HEA) + (Al, Ce, HEA) + (Additional IMC*) + (Al, Ce, HEA mixed) |

*Additional IMC = intermetallics resulting from elements or materials present in the alloys but separate from the majority material, e.g., V in a Ti—Al—V alloy; Metalloceramic compounds are ceramic in nature have at least one metallic constituent within the ordered crystalline structure.

In any of the foregoing or following embodiments, contacting the surface of the preform with the molten infiltrant may comprise dipping the surface of the preform into the molten infiltrant. Alternatively, if the preform defines an internal cavity, the cavity may be filled with the infiltrant; in such embodiments, the infiltrant may be melted before or after filling the cavity with the infiltrant.

The temperature $T_1$ is greater than a melting point of the infiltrant and less than a melting point of the reinforcement material particles. When the reinforcement material is Ti-6Al-4V, $T_1$ is greater than a melting point of the infiltrant and less than 1600° C. In some embodiments, $T_1$ ranges from 900-1600° C., such as from 900-1200° C., 900-1100° C., or 1000-1100° C.

The temperature $T_2$ is less than a melting point of the infiltrant. In some embodiments, $T_2$ ranges from ambient temperature (e.g., 20-30° C.) to 800° C., such as from 20-400° C., 20-200° C., or 20-100° C.

The temperature $T_3$ is effective to melt or decompose the binder and is less than a melting point of the reinforcement material particles. In some embodiments, such as when the preform is contacted with the infiltrant prior to binder removal, $T_3$ also is less than a melting point of the infiltrant. In some embodiments, $T_3$ ranges from 180-875° C., such as from 500-875° C., 600-850° C., 700-850° C., or 750-850° C. In certain embodiments, the temperature $T_3$ is ramped up from a lower temperature, e.g., 180-400° C., to a higher temperature, e.g., 500-875° C., to slowly burn out of the binder without forming pores or other defects.

The temperature $T_4$ ranges from greater than 300° C. to less than a melting temperature of all phase components. In some embodiments, the temperature $T_4$ ranges from greater than 300° C. to 875° C., such as 350-800° C.

Figure 5:
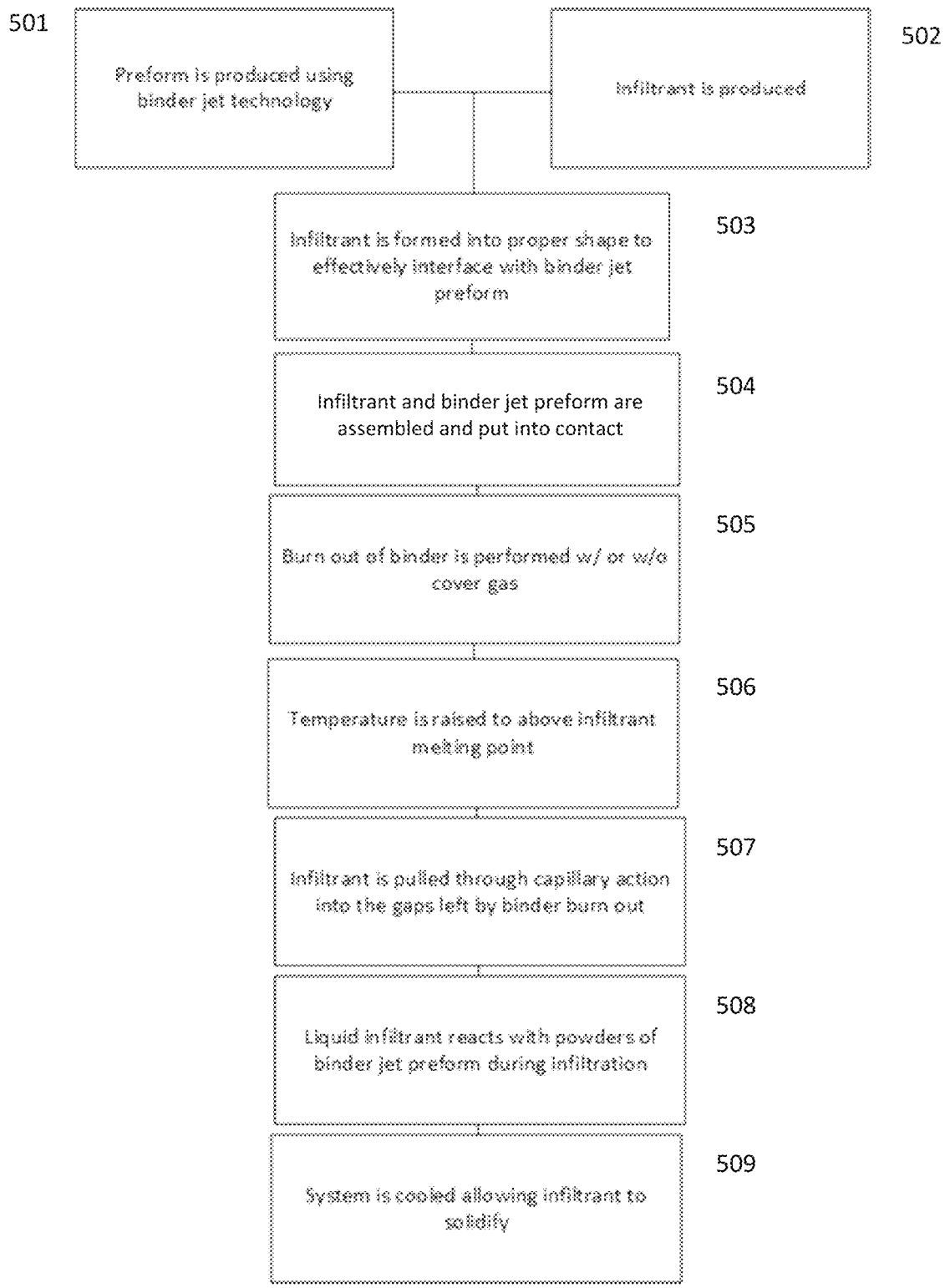
FIG. 5 is a flow diagram of another embodiment of a reactive matrix infiltration process according to the present disclosure.

In any of the foregoing or following embodiments, the preform may be produced using binder jet technology, powder injection molding, slurry-vat photopolymerization, powder slurry extrusion, or die press powders, among other techniques. In one exemplary embodiment, as shown in the flow diagram of FIG. 5, a binder jet preform and an infiltrant comprising a reactive matrix material are produced (steps 501 and 502, respectively). The infiltrant is formed into a shape to interface with the binder jet preform (step 503). Where the infiltrant is, for example, a plurality of particles (e.g., powder particles, granules, chips, or the like), forming the infiltrant into a shape may be optional. The infiltrant and binder jet preform are assembled and put into contact (step 504). Burn out of the binder is performed with or without a non-reactive gas (step 505), e.g., at the temperature $T_3$. The temperature is then raised to above the infiltrant melting point (step 506), e.g., to the temperature $T_1$. The infiltrant is pulled through capillary action into the gaps left by binder burn-out (step 507), and reacts with the powders of the binder jet preform during infiltration (step 508). The system is then cooled, e.g., to the temperature $T_2$, allowing the molten infiltrant to solidify (step 509) to produce a form comprising a composite material.

Figure 6:
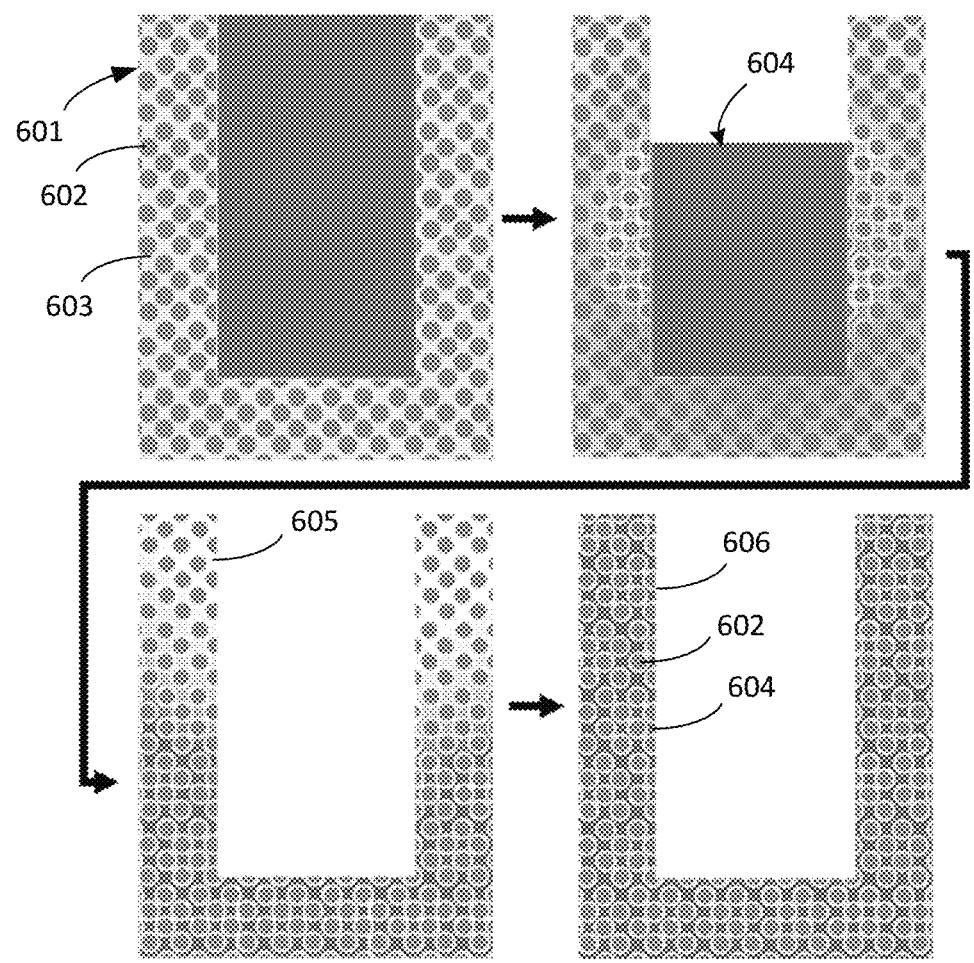
FIG. 6 is a graphical representation of one embodiment of a reactive matrix infiltration process.

FIG. 6 is a graphical representation of one embodiment of a reactive matrix infiltration process. A preform 601 comprises a plurality of reinforcement material particles 602 and a binder 603. Although the schematic diagram of FIG. 6 indicates that binder 603 fills all spaces between the reinforcement material particles 602, a person of ordinary skill in the art of binder jet manufacturing understands that the binder 603 may not occupy all spaces between the particles 602. In some embodiments, the binder 603 is primarily located at the neck junctions between particles 602 and the preform 601 may include gaps that are not occupied by the binder 603. An infiltrant 604 comprising a reactive matrix material (e.g., an Al—Ce alloy) is placed in the preform 601. The preform 601 and infiltrant 604 are heated to burn out the binder 603, producing gaps 605. The infiltrant 604 is melted and fills the gaps 605 left by the binder burnout. In contrast to the process exemplified in FIG. 3, however, the molten infiltrant 604 comprises a reactive matrix material, which reacts with the reinforcement material particles 602, producing an intermetallic layer 606 surrounding the reinforcement material particles 602.

Notably, the reinforcement material particles 602 typically are smaller after infiltration and reaction with the molten infiltrant. If the reinforcement material particles 602 are sufficiently small and/or the reaction is substantially complete, the composite material may not include residual reinforcement material particles 602 and will instead comprise one or more intermetallic phases 606 and potentially unreacted infiltrant (matrix material) 604.

Figure 7:
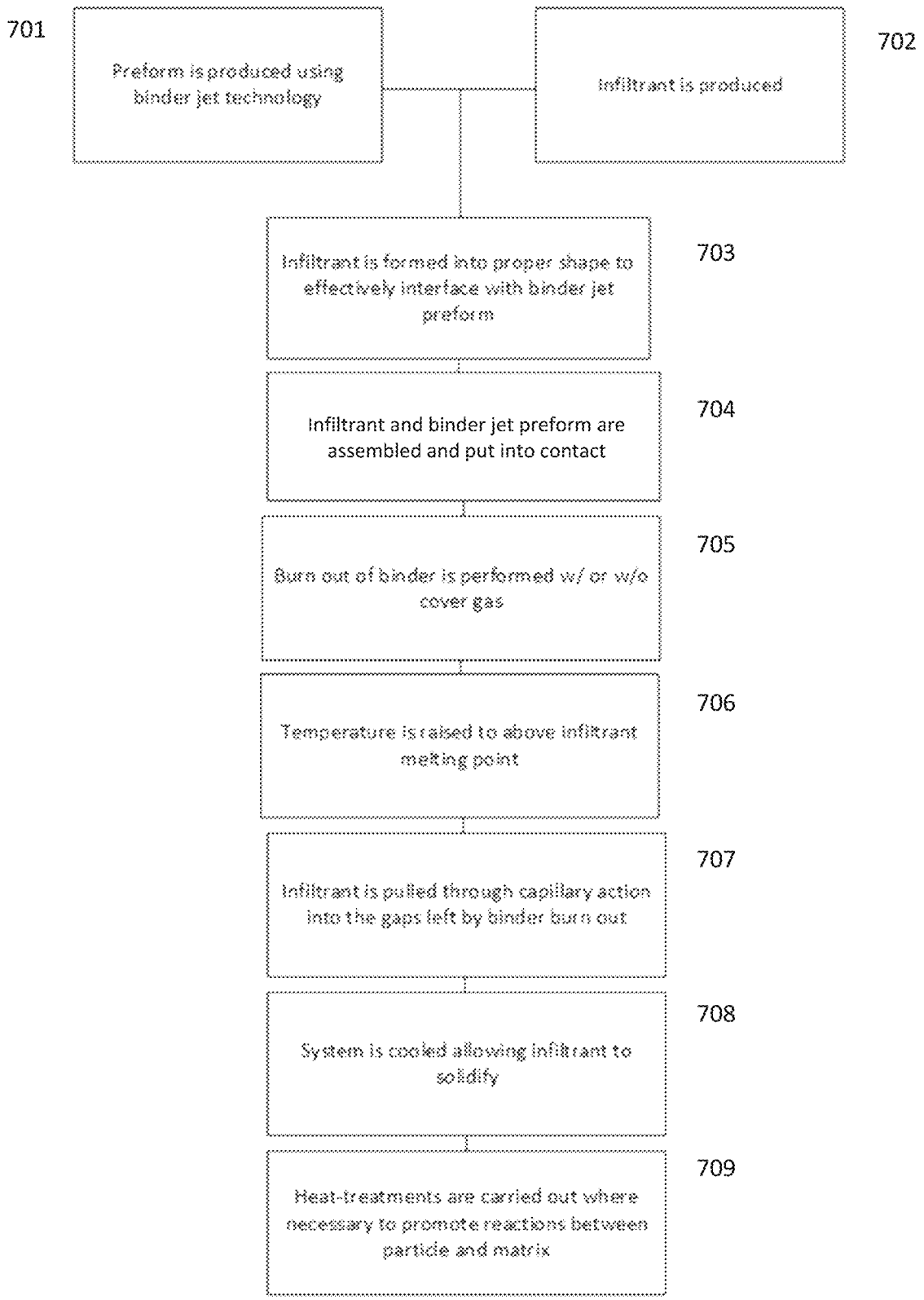
FIG. 7 is a flow diagram of another embodiment of a reactive matrix infiltration process wherein the reaction is produced by heat treatment following initial composite material formation.
Figure 8:
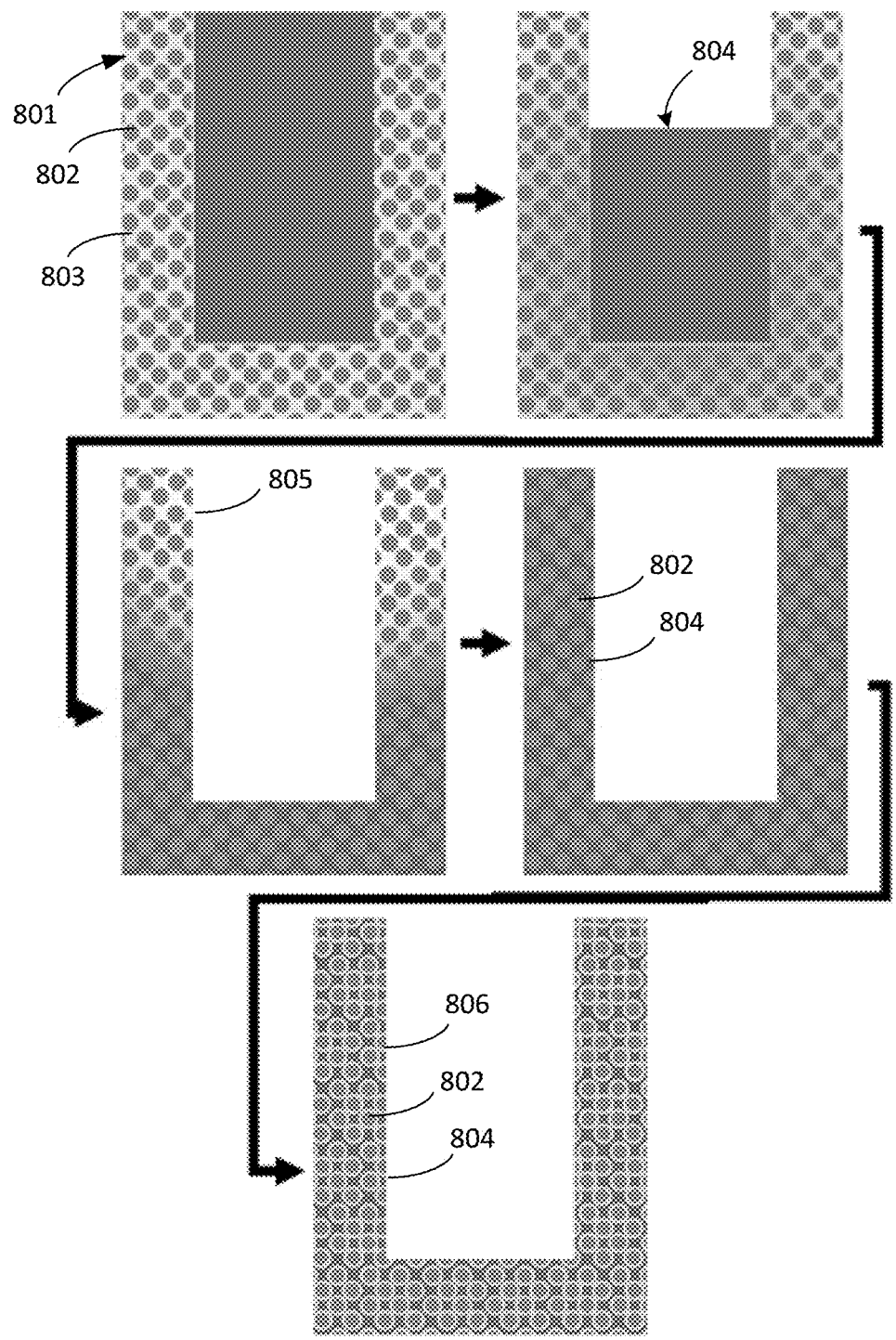
FIG. 8 is a graphical representation of a reactive matrix infiltration process wherein the reaction is produced by heat treatment following initial composite material formation.

FIGS. 7 and 8 are a flow diagram and a graphical representation, respectively, of an embodiment of a reactive matrix infiltration process wherein reaction between the matrix material and reinforcement material is induced by heat treatment after formation of an initial composite material. As shown in FIG. 7, a binder jet preform and an infiltrant comprising a reactive matrix material are produced (steps 701 and 702, respectively). The infiltrant is formed into a shape to interface with the binder jet preform (step 703). Where the infiltrant is, for example, a plurality of particles (e.g., powder particles, granules, chips, or the like), forming the infiltrant into a shape may be optional. The infiltrant and binder jet preform are assembled and put into contact (step 704). Burn out of the binder is performed with or without a non-reactive gas (step 705), e.g., at the temperature $T_3$. The temperature is then raised to above the infiltrant melting point (step 706), e.g., to the temperature $T_1$. The molten infiltrant is pulled through capillary action into the gaps left by binder burn-out (step 707). The system is then cooled, e.g., to the temperature $T_2$, allowing the infiltrant to solidify (step 708). Subsequent heat treatments are carried out to promote reactions between the reinforcement material particles and the infiltrant (matrix material) (step 709), thereby producing a form comprising a composite material.

As shown in FIG. 8, a preform 801 comprises a plurality of reinforcement material particles 802 and a binder 803. Although the schematic diagram of FIG. 8 indicates that binder 803 fills all spaces between the reinforcement material particles 802, a person of ordinary skill in the art of binder jet manufacturing understands that the binder 803 may not occupy all spaces between the particles 802. In some embodiments, the binder 803 is primarily located at the neck junctions between particles 802 and the preform 801 may include gaps that are not occupied by the binder 803. An infiltrant 804 comprising a reactive matrix material (e.g., an Al—Ce alloy) is placed in the preform. The preform 801 and infiltrant 804 are heated to burn out the binder 803, producing gaps 805. The infiltrant 804 is melted and fills the gaps 805 left by the binder burnout. The preform 801 is cooled to provide a composite material comprising the reinforcement material particles 802 and the solidified infiltrant or matrix material 804. In a subsequent heat treatment step, the infiltrant (matrix material) 804 reacts with the reinforcement material particles 802, producing an intermetallic layer 806 surrounding the reinforcement material particles 802. Notably, the reinforcement material particles 802 typically are smaller after infiltration and reaction with the matrix material. If the reinforcement material particles 802 are sufficiently small and/or the reaction is substantially complete, the composite material may not include residual reinforcement material particles 802 and will instead comprise one or more intermetallics and potentially unreacted infiltrant (matrix material) 804.

Figure 9:
FIG. 9 is a flow diagram of another embodiment of a reactive matrix infiltration process wherein reaction occurs during infiltration and during subsequent heat treatment following initial composite material formation.
Figure 10:
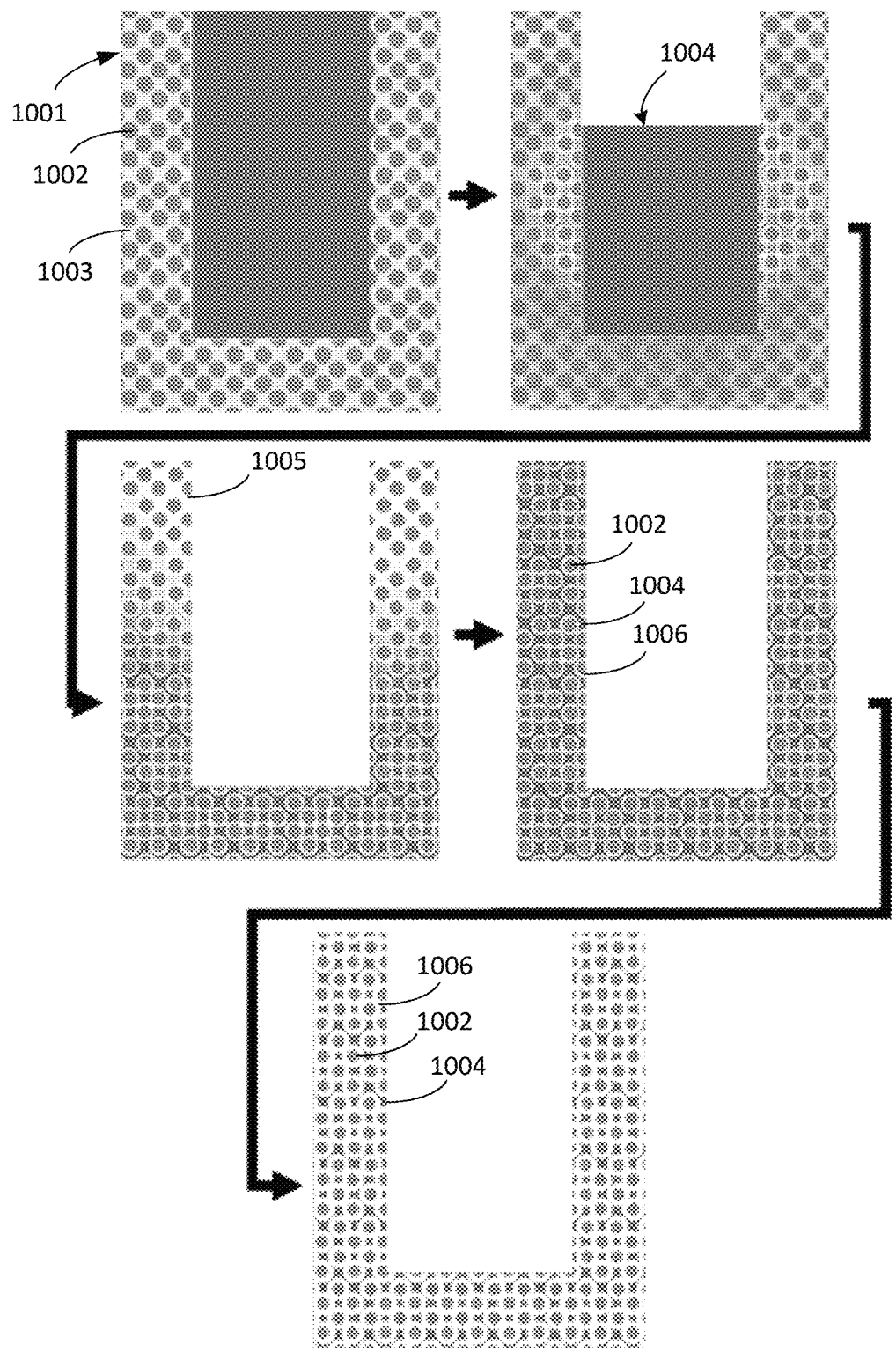
FIG. 10 is a graphical representation of a reactive matrix infiltration process wherein reaction occurs during infiltration and during subsequent heat treatment following initial composite material formation.

In still another embodiment, as exemplified in FIGS. 9 and 10, the molten infiltrant reacts with the reinforcement material during infiltration to form an initial composite material, and subsequent heat treatments induce further reaction between the matrix material and reinforcement materials. As shown in FIG. 9, a binder jet preform and an infiltrant comprising a reactive matrix material are produced (steps 901 and 902, respectively). The infiltrant is formed into a shape to interface with the binder jet preform (step 903). Where the infiltrant is, for example, a plurality of particles (e.g., powder particles, granules, chips, or the like), forming the infiltrant into a shape may be optional. The infiltrant and binder jet preform are assembled and put into contact (step 904). Burn out of the binder is performed with or without a non-reactive gas (step 905), e.g., at the temperature $T_3$. The temperature is then raised to above the infiltrant melting point (step 906), e.g., to the temperature $T_1$. The molten infiltrant is pulled through capillary action into the gaps between the particles and left by binder burn-out (step 907) and reacts with the powders of the binder jet preform during infiltration (step 908). The system is then cooled, e.g., to the temperature $T_2$, allowing the molten infiltrant to solidify (step 909), thereby producing a form comprising a composite material. Subsequent heat treatments can be carried out to promote additional reactions between the reinforcement material particles and the infiltrant (matrix material) (step 910). As shown in FIG. 10, the preform 1001 comprises a plurality of reinforcement material particles 1002 and a binder 1003. Although the schematic diagram of FIG. 10 indicates that binder 1003 fills all spaces between the reinforcement material particles 1002, a person of ordinary skill in the art of binder jet manufacturing understands that the binder 1003 may not occupy all spaces between the particles 1002. In some embodiments, the binder 1003 is primarily located at the neck junctions between particles 1002 and the preform 1001 may include gaps that are not occupied by the binder 1003. An infiltrant 1004 comprising a reactive matrix material (e.g., an Al—Ce alloy) is placed in the preform 1001. The preform 1001 and infiltrant 1004 are heated to burn out the binder 1003, producing gaps 1005. The infiltrant 1004 is melted and fills the gaps 1005 left by the binder burnout. The infiltrant 1004 comprises a reactive matrix material, which reacts with the reinforcement material particles 1002, producing an intermetallic layer 1006 surrounding the reinforcement material particles 1002. Subsequent heat treatment induces additional reaction between the infiltrant (matrix material) 1004 and reinforcement material particles 1002, increasing the thickness of the intermetallic layer 1006. Notably, the reinforcement material particles 1002 typically are smaller after infiltration and reaction with the matrix material. If the reinforcement material particles 1002 is sufficiently small and/or the reaction is substantially complete, the composite material may not include residual reinforcement material particles 1002 and will instead comprise one or more intermetallics and potentially unreacted infiltrant (matrix material) 1004.

Figure 11:
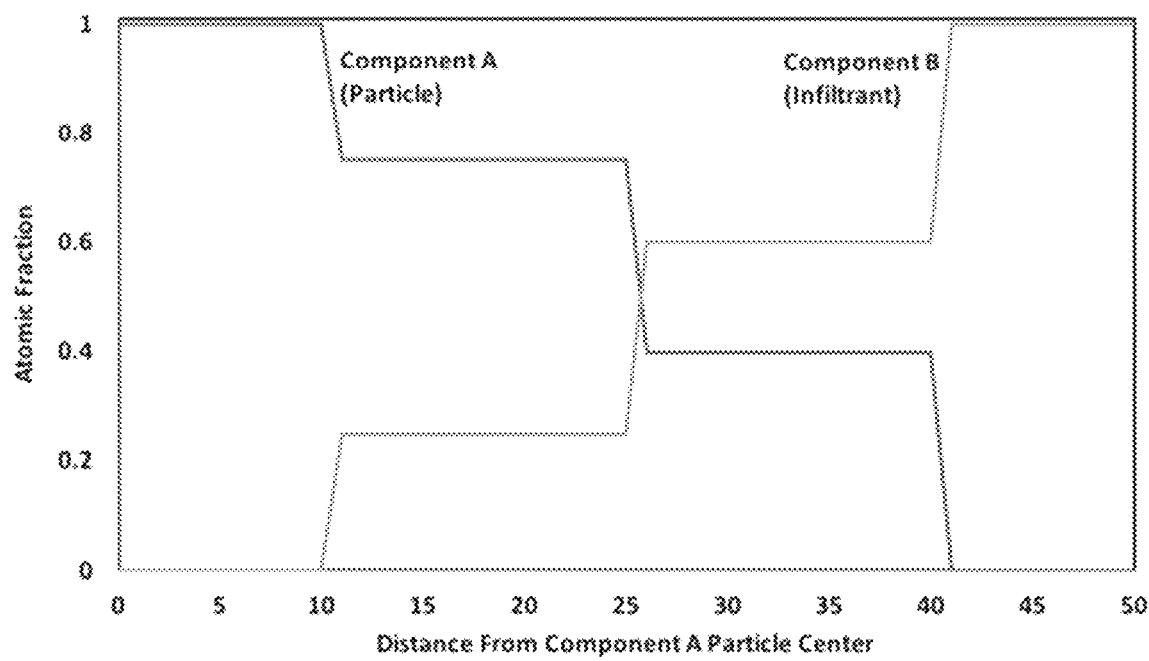
FIG. 11 is a graph showing a simulated element diffusion from a reinforcement material particle and an element from a reactive matrix infiltrant, producing a series of distinct intermetallic compounds moving outward from the particle center.
Figure 12:
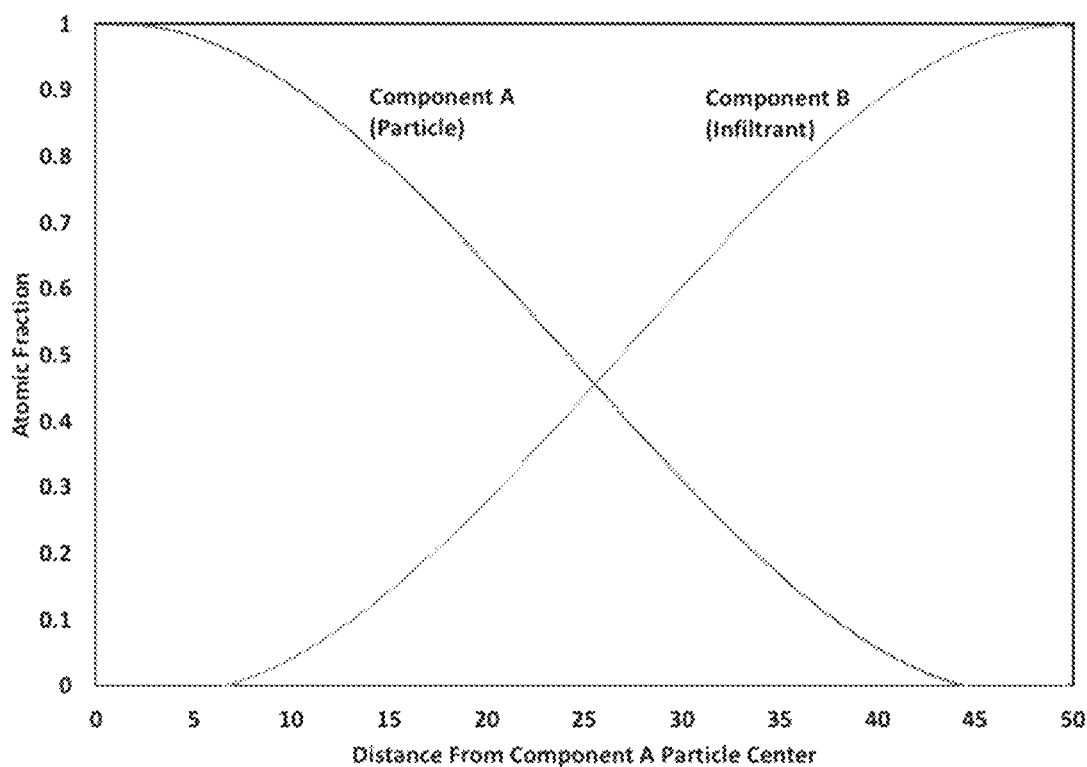
FIG. 12 is a graph showing a simulated element diffusion from a reinforcement material particle and an element from a reactive matrix infiltrant, producing an intermetallic phase layer having a gradient composition.

In any of the foregoing or following embodiments, reactions occurring at the interface between the matrix material of the infiltrant and the reinforcement material particle surfaces may include, but are not limited to, dissolving a portion of the reinforcement material particle; forming a solid-state diffusion couple between the particle and the infiltrant, resulting in distinct intermetallic phases at stepped intervals (i.e., forming a plurality of distinct intermetallic layers surrounding the reinforcement material particle); forming a solid-state compositionally graded solution at the particle/infiltrant interface; and combinations thereof. FIG. 11 is a graph showing a simulated element diffusion from a reinforcement material particle and an element from a reactive matrix infiltrant, producing a series of distinct intermetallic compounds moving outward from the particle center. FIG. 12 is a graph showing a simulated element diffusion from a reinforcement material particle and an element from a reactive matrix infiltrant, producing an intermetallic phase layer having a gradient composition.

In any of the foregoing or following embodiments, the extents of infiltration and reaction may be controlled by selecting the reinforcement material composition, reinforcement material particle size and/or shape, matrix material composition, infiltration temperature, infiltration time, gaseous environment, and combinations thereof. For example, an infiltration temperature that is too high may result in rapid reaction between the infiltrant and reinforcement material particles, producing reaction fronts that impede capillary action and further infiltration. In some embodiments, a two-step process can be performed whereby the binder is removed from the preform prior to infiltration. In some examples, simultaneous binder burn-out and infiltration may produce reaction fronts that impede capillary action. For instance, carbides may form at the infiltration front as the matrix material reacts with binder material. The carbides reduce the number of possible infiltration pathways and may result in an incomplete infiltration process. FIG. 13 is a graphical representation of a reactive matrix infiltration process wherein reaction products 1307 block pathways (gaps) 1305 for further infiltration by the infiltrant (matrix material) 1304. The form 1301 may retain porosity with gaps 1305 between reinforcement particles 1302 and surround intermetallic layers 1306 and/or may retain regions of binder between reinforcement particles. Infiltration and reaction rates also can be controlled through particle size and/or shape to limit or increase surface area available for reactions while also controlling the size and volume fraction of infiltration pathways. Reaction temperature also influences infiltration by affecting melt fluidity. For example, at higher temperatures the molten infiltrant may have increased fluidity, thereby infiltrating easier into the gaps between the reinforcement material particles. With more complete infiltration, the resulting product will have decreased porosity. For example, as infiltration increases, at least 50 vol %, at least 60 vol %, at least 70 vol %, at least 80 vol %, or even at least 90 vol % of the spaces between the reinforcement material particles is filled with the matrix material and resulting intermetallic phase. In certain embodiments, 50-100 vol %, 60-100 vol %, 70-100 vol %, 80-100 vol %, 90-100 vol %, 90-99 vol %, or 90-95 vol % of the spaces is filled. In some embodiments, the rate of cooling after infiltration, e.g., from the temperature $T_1$ to the temperature $T_2$, also influences the reaction. Rapid cooling may produce a thinner intermetallic phase and/or fewer intermetallic phases, whereas a more gradual cooling produces a thicker intermetallic phase and/or more intermetallic phases, providing a greater volumetric portion of intermetallics in the composite material.

Figure 14:
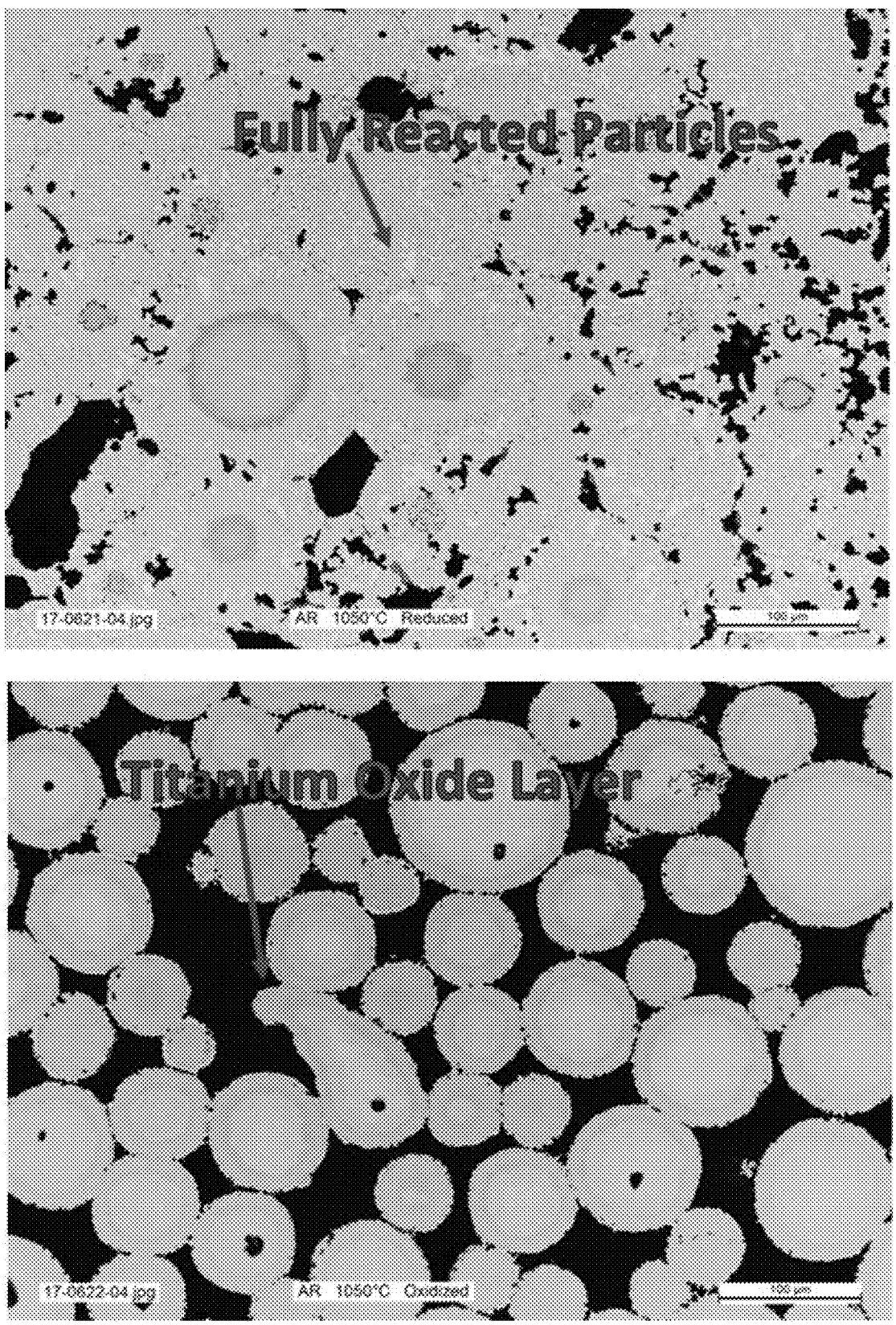
FIG. 14 shows two high-magnification images of a material formed by reactive matrix infiltration after binder burnout under an argon atmosphere (top) or an oxygen atmosphere (bottom).

Another consideration is particle surface condition. For instance, when particles have an oxidized surface, reduced particle wetting by the infiltrant and reduced infiltration efficacy may occur. FIG. 14 shows differences in infiltration following burnout of binder from a preform comprising Ti—Al—V particles under an argon atmosphere, preventing surface oxidation and leading to effective wetting and infiltration (top), and following binder burnout under an oxygen atmosphere, forming a stable oxide layer at the particle surfaces and preventing wetting and subsequent infiltration (bottom). When the oxide layer prevents adequate wetting and infiltration, there are empty spaces between reinforcement material particles, and the resulting form is porous and may be mechanically weak.

In some embodiments, a reactive matrix material comprising an Al—Ce alloy may eliminate problems stemming from oxidation of the reinforcement material particle surface. Without wishing to be bound by a particular theory of operation, it currently is believed that in some embodiments, the Ce has an oxide "scouring" effect and removes the oxides from the surface as the Al—Ce alloy infiltrates into the preform, thereby facilitating particle wetting, complete or substantially complete infiltration, and subsequent reaction between the matrix material and reinforcement material. Al—Ce alloys also provide additional benefits for reactive matrix infiltration processes as disclosed herein including, but not limited to having a low melting point relative to many reinforcement materials which increases the utility of the Al—Ce alloy as a reactive matrix material, desirable fluidity characteristics and capillary effects, high reactivity with many reinforcement materials, and strong bonds between the matrix material, intermetallic phase(s), and reinforcement material particles. In some embodiments, a time evolution in composition over the course of the reaction between the Al—Ce alloy and reinforcement material occurs due to forming solid-state diffusion couples or solid-state compositionally graded solutions comprising one or more elements from the reinforcement material and the Al and/or Ce, providing a plurality of distinct intermetallic phase layers or a gradient composition as the reaction progresses. For example, in some embodiments of the disclosed process wherein the reinforcement material is a Ti alloy, a diffusion couple forms between at least Ti and Al, producing a plurality of intermetallic phases or a gradient composition comprising at least Ti and Al. The intermetallics may progress through the most Ti-rich intermetallic near the reinforcement particle surface to progressively more Al-rich intermetallics as the average distance from a center of the reinforcement material particle increases and the Ti diffusion increase. The resulting composite materials are very different from materials formed by non-reactive matrix infiltration in which no intermetallic phases are produced.

While process embodiments exemplified herein utilize Al—Ce alloys as the matrix material, other matrix materials may alternatively be used. For instance, other reactive matrix materials may include Al—La alloys, Al-rare earth element alloys, aluminum, titanium and its alloys, Ti and its alloys, Cu and its alloys, Mg and its alloys, or Fe and its alloys. However, in particular embodiments, the matrix material is selected such that the matrix material melting point is less than the reinforcement material melting point.

IV. Composite Material Forms

Composite material forms produced by embodiments of the disclosed process are useful across a range of industries and application environments, including high-temperature environments. Some embodiments of the disclosed composite material forms may be useful, for example, in aerospace applications. For example, the composite material forms may be useful for airplane engine components, airplane fastening elements, airframe components, landing gear of airplanes, and the like. Additionally, embodiments of the disclosed composite material forms may be used in other technologies, such as automobiles, ships, missiles, spacecraft, and armor plating, among others.

With reference to FIGS. 15A and 15B, some embodiments of the disclosed method produce composite material forms 1500 comprising a plurality of reinforcement particles 1502, a matrix material 1504 at least partially filling spaces between the reinforcement material particles, and at least one intermetallic phase 1506 including one or more elements of the reinforcement material, Al, and Ce. The intermetallic phase 1506 surrounds at least some of the reinforcement particles 1502. In some embodiments at least 50%, at least 60%, at least 70%, at least 80%, at least 90%, or at least 95% of the reinforcement particles are surrounded by the intermetallic phase. In any of the foregoing or following embodiments, at least 50 vol %, at least 60 vol %, at least 70 vol %, at least 80 vol %, or even at least 90 vol % of the spaces between the reinforcement material particles is filled with the matrix material and intermetallic phase. In certain embodiments, 50-100 vol %, 60-100 vol %, 70-100 vol %, 80-100 vol %, 90-100 vol %, 90-99 vol %, or 90-95 vol % of the spaces is filled. As shown in FIGS. 15A and 15B, the relative volume fractions of reinforcement particles 1502 and matrix material 1504 depend at least in part on the size of the reinforcement particles 1502. Larger particles (FIG. 15B) pack together less tightly than smaller particles (FIG. 15A), leaving bigger spaces between the particles, which are filled with the matrix material 1504. When the reinforcement material particles are larger, the volume fraction of reinforcement particles is less and the volume fraction of the matrix material is more than when smaller reinforcement material particles are used.

In any of the foregoing or following embodiments, prior to reaction, the matrix material may comprise 5-20 wt % Ce, such as 6-16 wt % or 10-16 wt % Ce, with the balance being Al. In some embodiments, the matrix material consists of or consists essentially of the Al—Ce alloy. The Al—Ce alloy may consist of or consist essentially of Al and Ce.

In any of the foregoing or following embodiments, the reinforcement material may be a metal alloy or a ceramic. In some embodiments, the reinforcement material is a titanium alloy, a nickel alloy (e.g., a nickel-chromium alloy), a copper alloy (e.g., bronze), an iron alloy, a steel (e.g., carbon steel, stainless steel), or any combination thereof. In certain embodiments, the reinforcement material is a Ti—Al—V alloy, such as Ti-6Al-4V. In any of the foregoing or following embodiments, prior to reaction, the reinforcement material particles may have (i) an initial average diameter within a range of from 20 μm to 250 μm; or (ii) an initial aspect ratio within a range of from 1 to 10; or (iii) both (i) and (ii). Following a reaction between the reinforcement material particles and the matrix material, the reinforcement material particles may have a smaller average diameter and/or a different aspect ratio (smaller or larger) as portions of the reinforcement material react with the matrix material to form the intermetallic phase. For example, the final average diameter may be at least 10% smaller, at least 20% smaller, at least 30% smaller, at least 40% smaller, or at least 50% smaller than the average diameter prior to reaction. In some embodiments, the average diameter of the reinforcement material particles in the form is 10-90% smaller, 20-80% smaller, or 30-70% smaller than the average diameter prior to reaction. The magnitude of the change depends, at least in part, on an extent of the reaction between the reinforcement material and the matrix material. Modifying the reaction conditions (e.g., the temperature) and the initial average diameter of the particles (e.g., to provide a greater or smaller surface area relative to a volume of the particles) allows the extent of the reaction and the final particle size to be tuned.

In any of the foregoing or following embodiments, the composite material form may comprise a plurality of intermetallic phases. In some examples, where the reinforcement material is a Ti alloy, the intermetallics progress from the most Ti-rich intermetallic near the reinforcement particle surface to progressively more Al-rich intermetallics as the average distance from a center of the reinforcement material particle increases and the Ti diffusion increase. Binary Ti—Al intermetallics include, but are not limited to, $Ti_3Al$, TiAl, and $TiAl_3$.

In some embodiments, the plurality of intermetallic phases form distinct layers surrounding the reinforcement material particles. In one example, as shown in FIG. 16, a composite material form 1600 comprises one or more reinforcement material particles 1602, a matrix material 1604, and a plurality of intermetallic layers 1606, 1608, 1610 surrounding the reinforcement material particle 1602. Although the exemplary embodiment shown in FIG. 16 includes three intermetallic layers, a person of ordinary skill in the art, with the benefit of the present disclosure, will understand that the composite material may include fewer or more intermetallic layers, i.e., 2, 3, 4, 5, 6, or more intermetallic layers. Each intermetallic layer has a distinct chemical composition. In some embodiments, the reinforcement material comprises a first metal M1, and each intermetallic layer comprises M1, Al, and Ce. In some embodiments, M1 is the primary, or majority, metal of the reinforcement material. Thus, when the reinforcement material comprises Ti-6Al-4V, for example, M1 may be Ti. In certain embodiments, average concentrations of M1 decrease in each successive intermetallic layer. Thus an average concentration of M1 in intermetallic phase layer 1608 is lower than an average concentration of M1 in intermetallic phase layer 1606, and an average concentration of M1 in intermetallic phase layer 1610 is lower than the average concentration of M1 in intermetallic phase layer 1608. Conversely, the average aluminum concentration may increase in each successive intermetallic layer. The average concentrations are illustrated graphically in the simulated diffusion of FIG. 11 where "Component A" represents M1 and "Component B" represents Al. In some embodiments, M1 is titanium.

In some embodiments, the reinforcement material comprises a first metal M1, and the resulting composite material form comprises one or more gradient core-shell structures 1701 as shown in FIG. 17. A composite material form 1700 comprises a matrix material 1704 and a gradient core-shell structure 1701 comprising a reinforcement material core particle 1702 and an intermetallic layer 1706 having a compositional gradient. In contrast to the composite material form of FIG. 16, the composite material form shown in FIG. 17 does not include a plurality of distinct intermetallic layers, each layer having its own distinct intermetallic composition. Instead, in the composite material form of FIG. 17, the intermetallic layer 1706 has a compositional gradient in which an average concentration of M1 decreases with increasing distance from the core particle 1702, and an average concentration of Al increases with increasing distance from the core particle. In some embodiments, an average concentration of Ce also increases with increasing distance from the core particle. When the reinforcement material comprises Ti-6Al-4V, for example, M1 may be Ti. Other elements present in the reinforcement material but absent in the matrix material (Al—Ce) also may decrease with increasing distance from the core particle. Thus, an average concentration of V also may decrease with increasing distance from the core particle. The average concentrations of M1 and Al are illustrated graphically in the simulated diffusion of FIG. 12 where "Component A" represents M1 and "Component B" represents Al.

Figure 18:
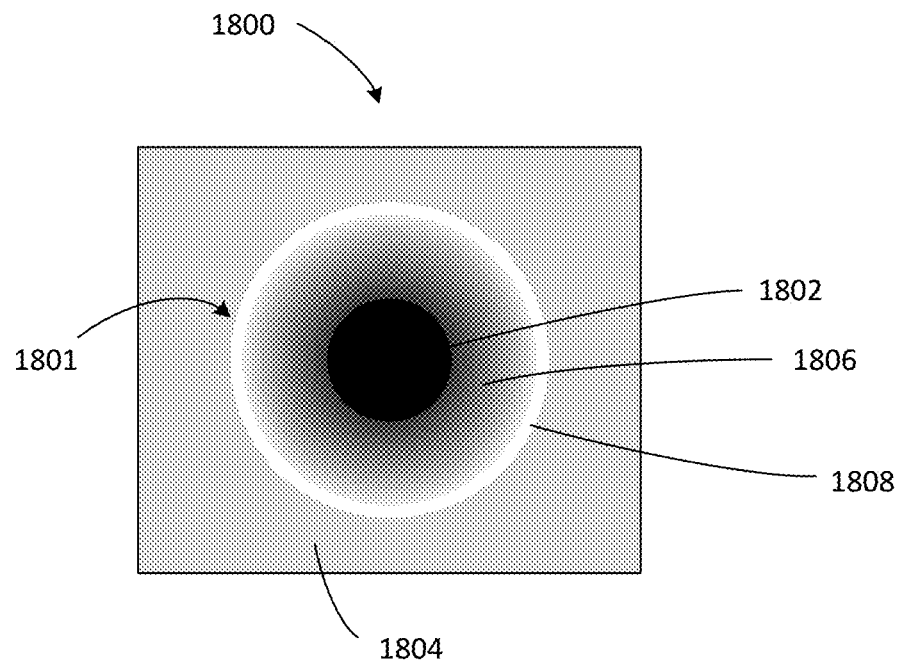
FIG. 18 is an expanded schematic cross-sectional view of a portion of a form produced by a reactive matrix infiltration process, including a gradient composition intermetallic phase layer around a reinforcement material particle and an outer cerium-rich shell.

In some embodiments, as shown in FIG. 18, a composite material form 1800 comprises a matrix material 1804 and one or more gradient core-shell structures 1801 comprising a reinforcement material particle 1802, a gradient core 1806 having a compositional gradient, and an outer cerium-rich shell 1808. When the reinforcement material comprises M1 and the matrix material comprises an Al—Ce alloy, the gradient core 1806 comprises M1, Al, Ce, and a plurality of intermetallic phases, providing a compositional gradient with a first average M1 concentration and a first average Ce concentration at a first average distance from a center of the core particle 1802, a second average M1 concentration and a second average Ce concentration at a second, further average distance from the center, wherein the second average M1 concentration is less than the first average M1 concentration. The shell 1808 may comprise an average Ce concentration at least 5-fold greater than the second average Ce concentration. In one embodiment, the second average Ce concentration is less than the first average Ce concentration. In another embodiment, the second average Ce concentration may not differ substantially from the first average Ce concentration; for example, the first and second average Ce concentrations may differ by less than ±20% or less than ±10% relative to one another.

Figure 19:
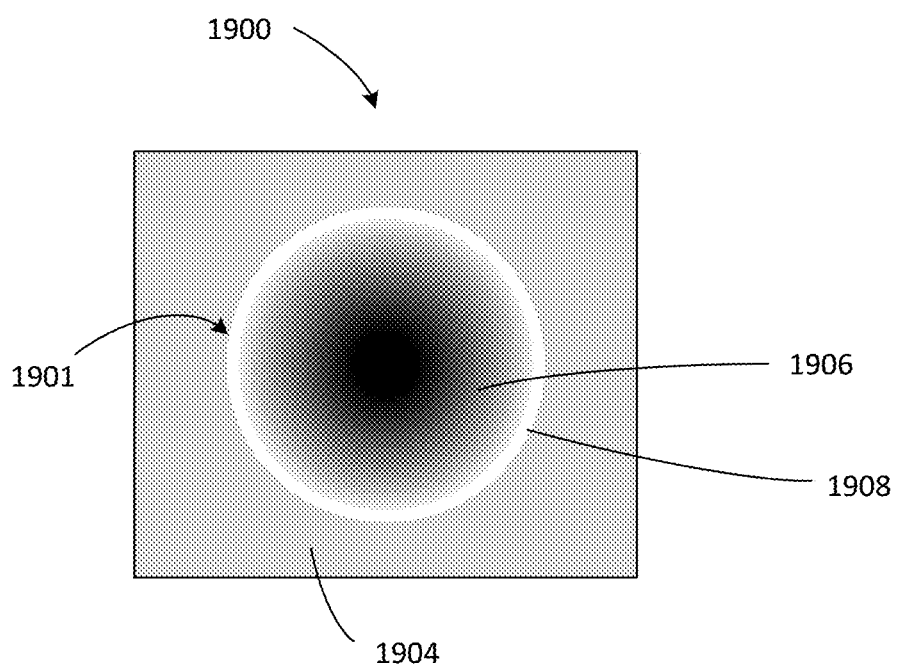
FIG. 19 is an expanded schematic cross-sectional view of a portion of a form produced by a reactive matrix infiltration process, including a gradient core and an outer cerium-rich shell.

In certain embodiments, as shown in the composite material form 1900 of FIG. 19, the initial reinforcement material particle comprising M1 may react completely with a matrix material 1904 comprising an Al—Ce alloy to form one or more gradient core-shell structures 1901 within the matrix material 1904, the gradient core-shell structure comprising a gradient core 1906 comprising M1, Al, and Ce, and a plurality of intermetallic phases, and an outer cerium-rich shell 1908. In such embodiments, there may be no detectable reinforcement material particle (e.g., as determined by EDS and/or high-magnification (SEM) imaging) remaining in the form 1900. The gradient core 1906 has a compositional gradient with a first average M1 concentration, and a first average Ce concentration at a first average distance from a center of the gradient core, a second average M1 concentration and a second average Ce concentration at a second, further average distance from the center, wherein the second average M1 concentration is less than the first average M1 concentration. The shell 1908 may comprise an average Ce concentration at least 5-fold greater than the second average Ce concentration. In one embodiment, the second average Ce concentration is less than the first average Ce concentration. In another embodiment, the second average Ce concentration may not differ substantially from the first average Ce concentration; for example, the first and second average Ce concentrations may differ by less than ±20% or less than ±10% relative to one another.

In any of the foregoing or following embodiments, the intermetallic layer 1806 or gradient core 1906 also may have a first average concentration of Al at a first average distance from the center and a second average Al concentration at a second, further average distance from the center, wherein the second average Al concentration is greater than the first average concentration. When the reinforcement material comprises additional elements besides M1 that are not present in the matrix material, then concentrations of those elements may decrease with increasing distance from the center of the core 1802/1902. For example, when the reinforcement material comprises Ti-6Al-4V, a first average V concentration at a first average distance from the center of the core may be greater than a second average V concentration at a second, further average distance from the core.

In any of the foregoing or following embodiments, the outer shell 1808/1908 may comprise an average Ce concentration at least 5-fold greater than the second average Ce concentration. In some embodiments, the average Ce concentration in the outer shell is at least 10-fold greater, at least 20-fold greater, or at least 50-fold greater than the second average Ce concentration. In certain embodiments, the average Ce concentration in the outer shell is 10-100×, 20-100×, 30-100×, 30-75×, or 30-60× greater than the second average Ce concentration. In some embodiments, an average Al concentration in the outer shell is less than the second average Al concentration. Thus, in certain embodiments, an average Ce to Al ratio in the outer shell may be greater than an average Ce to Al ratio at the second average distance and/or at the first average distance. In some embodiments, the average Ce:Al ratio on a w/w basis in the outer shell is ≥0.8, ≥0.9, or even ≥1, such as from 0.8 to 1.5 or 1:1.5, whereas the average Ce:Al ratio throughout the gradient intermetallic layer 1706 or gradient core 1806 is much lower, such as from 0.01-0.2 or 0.01-0.1.

Figure 20:
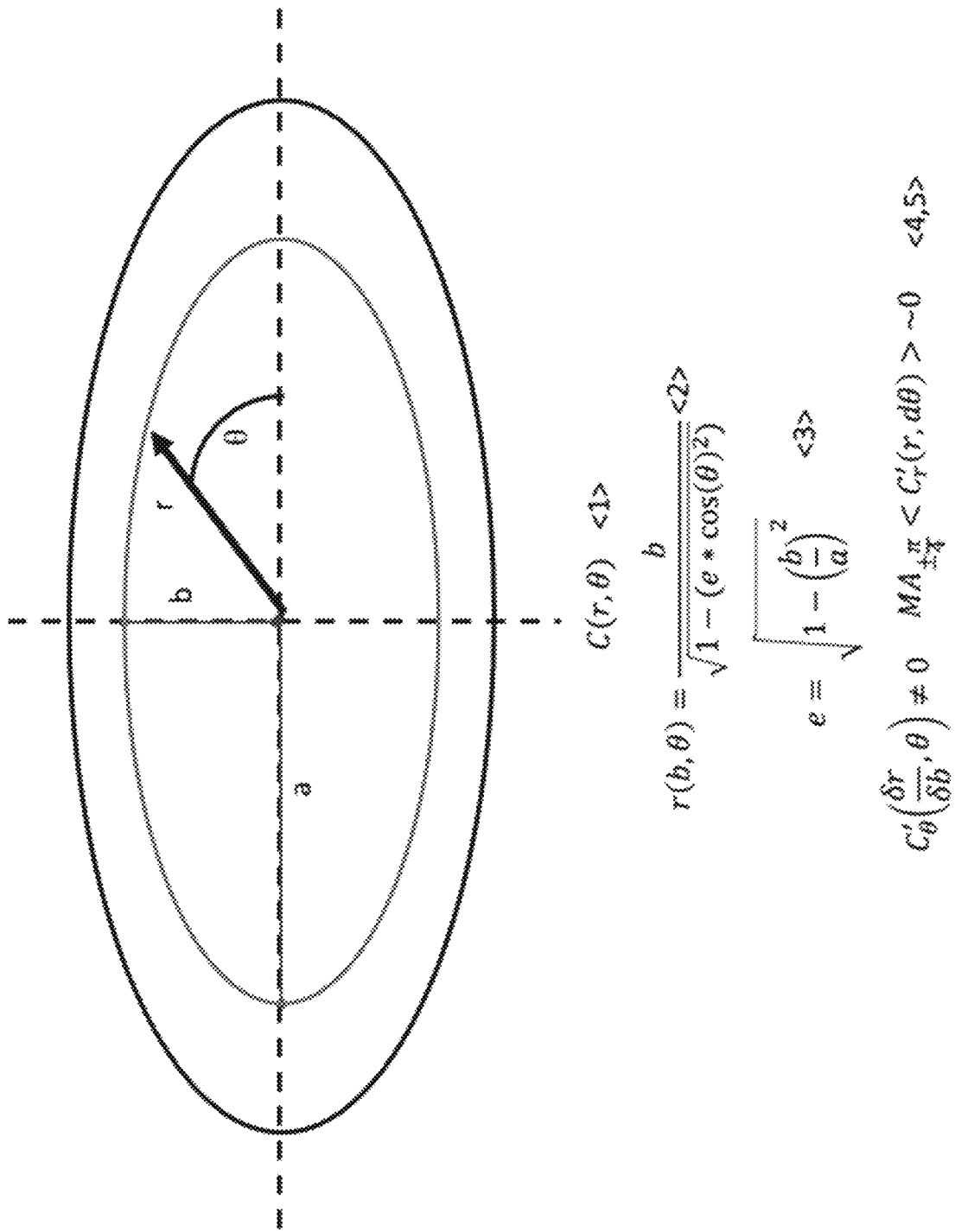
FIG. 20 is a graphical representation of a compositional gradient formed by a reactive matrix infiltration process.

In any of the foregoing embodiments, microstructure of materials formed by the disclosed processes exhibit features having a symmetry that is legacy from the original spherical or near spherical particles composing the powder preform. After reacting to form the interface which bonds the powder preforms to the matrix infiltrant, a compositional gradient structure may form. This gradient structure in three dimensions is symmetric about the original particle centroid but can be characterized via 2D slices. In each 2D slice will be found circular or elliptical features which follow to a large extent the compositional structure defined in the equations shown in FIG. 20. In this construction, the symmetry of the legacy feature is considered to be elliptical in nature but can be made circular by taking the eccentricity of the ellipse to be zero. Starting from Equation 1, which defines the composition of any point inside the area of elliptical or circular symmetry. Equation 2 defines an ellipse contained within the bounds of elliptical symmetry and centered about the feature's center with eccentricity e (Equation 3 where a and b are the length of the major and minor elliptical axis). The center may be defined as a point being equidistance from feature edges such that any line drawn through the particle and selected center point will bisect the particle. Composition can be measured at any point on this ellipse. The composition is expected to vary radially at a fixed theta, but to remain largely constant at a fixed radius and variable theta. These relationships are defined by Equations 4 and 5. Equation 4 gives that when theta is fixed if the radius is allowed to vary composition will also vary. In this case, it could be of a step wise type or a continuous smooth distribution depending on the elements present. Equation 5 states that at a fixed radius and variable theta the moving average over a $\pm\pi/4$ window should be nearly constant. Under certain circumstances the moving average composition might vary ±5% at a constant radius due largely to the non-uniformity of diffusion.

In any of the foregoing embodiments, the form may have increased mechanical strength compared to forms manufactured by infiltrating a powder preform with a non-reactive matrix material. Advantageously, the form may have increased mechanical strength at both ambient and elevated temperatures, making some embodiments of the disclosed forms suitable for use in high-temperature environments.

V. EXAMPLES

Figure 21:
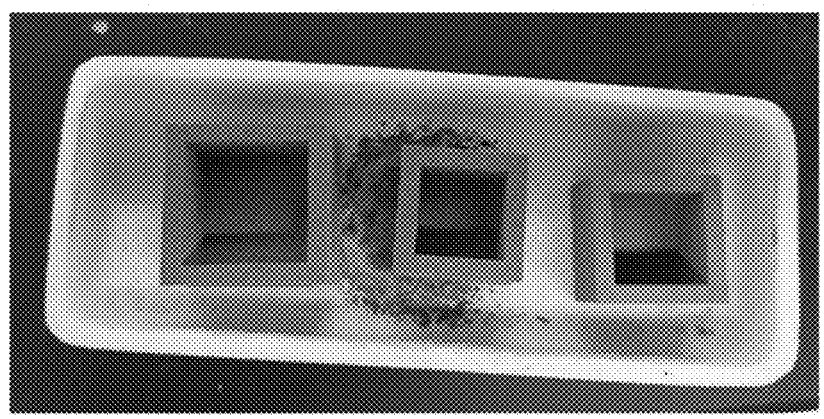
FIG. 21 is a photograph of empty cubic boats formed from Ti-6Al-4V powder particles and a binder.
Figure 22:
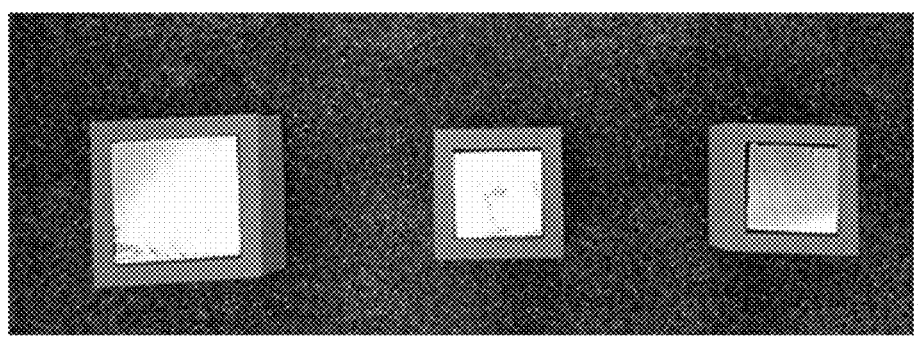
FIG. 22 is a photograph of the boats of FIG. 21 filled with an Al-12Ce alloy.
Figure 23:
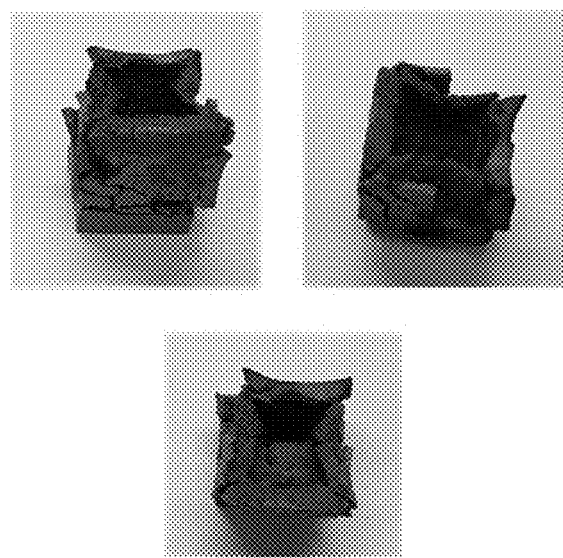
FIG. 23 shows photographs of the boats of FIG. 21 following heating at 1050° C. to simultaneously burn off binder and infiltrate the Al-12Ce alloy, resulting in a composite material.
Figure 24:
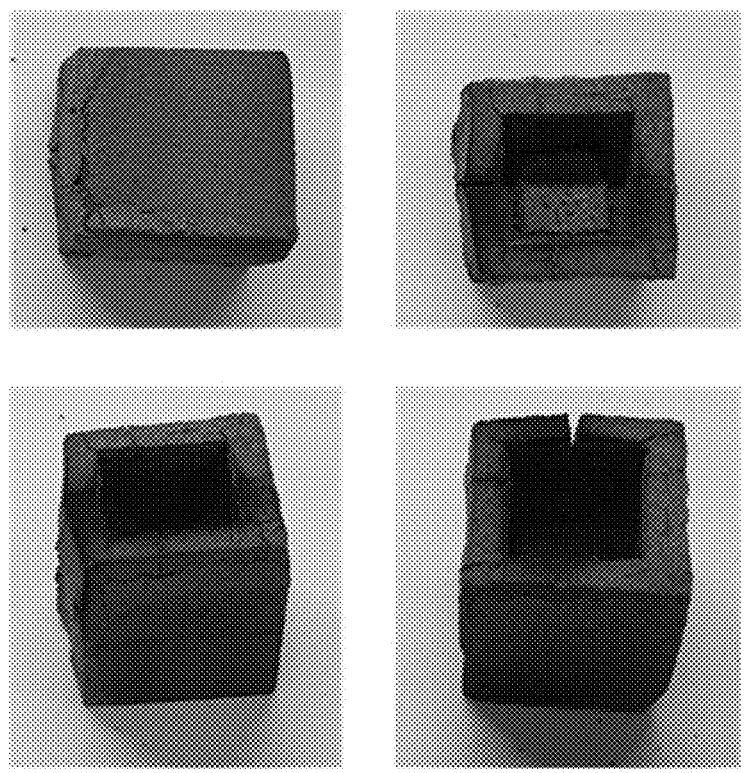
FIG. 24 shows photographs of the boats of FIG. 21 following heating at 800° C. to burn off binder, followed by heating at 1050° C. for infiltration, resulting in a composite material.

Cubic boats were produced by binder jet printing of Ti-6Al-4V powder and a binder (FIG. 21). An Al-12Ce alloy infiltrant was placed in the boats (FIG. 22). The boats and infiltrant were heated to 1050° C. to burn off the binder and melt the infiltrant. This process led to reduced geometric retention and portions of the preform separated entirely (FIG. 23). In this example, reaction kinetics impeded capillary action infiltration. Carbides formed at the infiltration front. The carbides reduced the possible pathways for infiltration and caused the process to be incomplete (FIG. 24).

In a second process, two steps were used to help control the geometric distortion and preform integrity. The boats were first heated to a binder burnout temperature of 800° C. while empty. Once the burn out was completed and the boats had cooled, the infiltrant material, an Al—Ce alloy, was loaded into the boat. The temperature was raised to 1050° C. where infiltration occurred. Images of boats produced from the 2-step process are shown in FIG. 24. A cross section of the boat produced from the 2-step process can be seen in FIG. 25, with a high magnification image of one portion shown in FIG. 26. The two-step process controlled infiltration and reaction rates leading to a more successful outcome.

Figure 25:
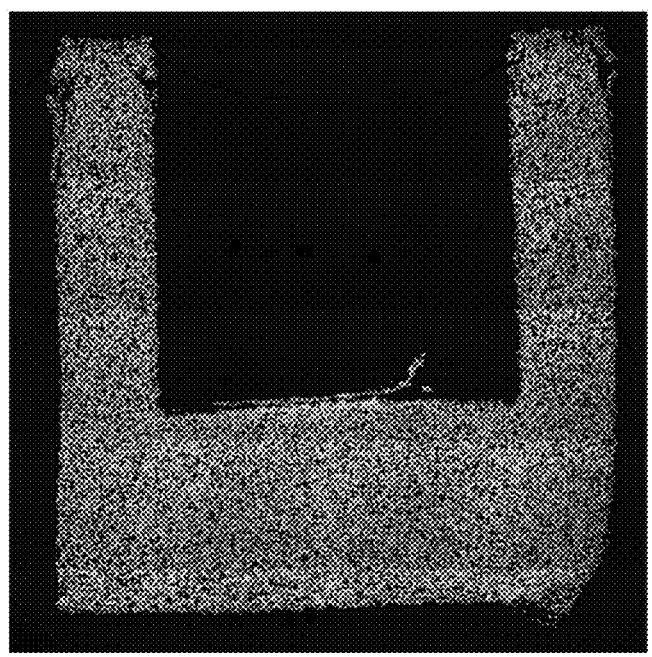
FIG. 25 is a photograph of a magnified cross-section of the composite material of FIG. 14.
Figure 26:
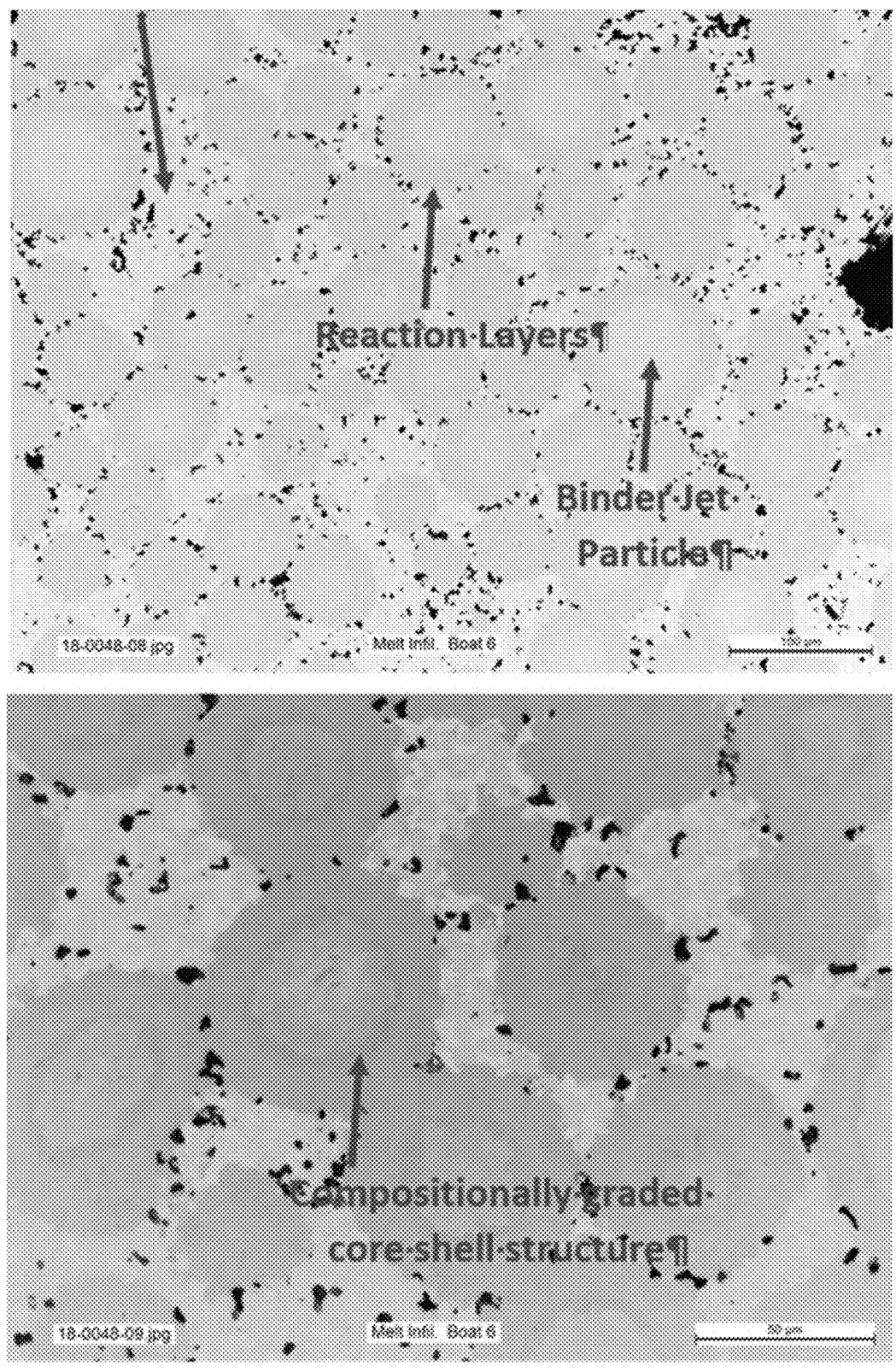
FIG. 26 shows two high-magnification images of the composite material of FIG. 24.

As shown in FIG. 25, following infiltration, there was consolidation of the Ti-6Al-4V powder particles and partial volumetric filling from infiltration with the Al—Ce alloy. Once the infiltrant is molten, capillary action draws the aluminum rich liquid into the binder jet preform and the matrix liquid reacts with the Ti-rich particle producing increased coherency at the particle matrix interface following solidification. In the case of Ti—Al interactions, the particle and matrix form a diffusion couple and produce a range of intermetallic phases which dissolve the particle into the surrounding matrix reducing the original particle's size, a trend related the relative diffusion rates of aluminum and titanium into each other (FIG. 26). FIG. 26 shows the matrix material, reinforcement material (binder jet) particle, and the reaction layer formed at the particle matrix interface. The reactions lead a core-shell interface structure as shown in the bottom photo.

Figure 27:
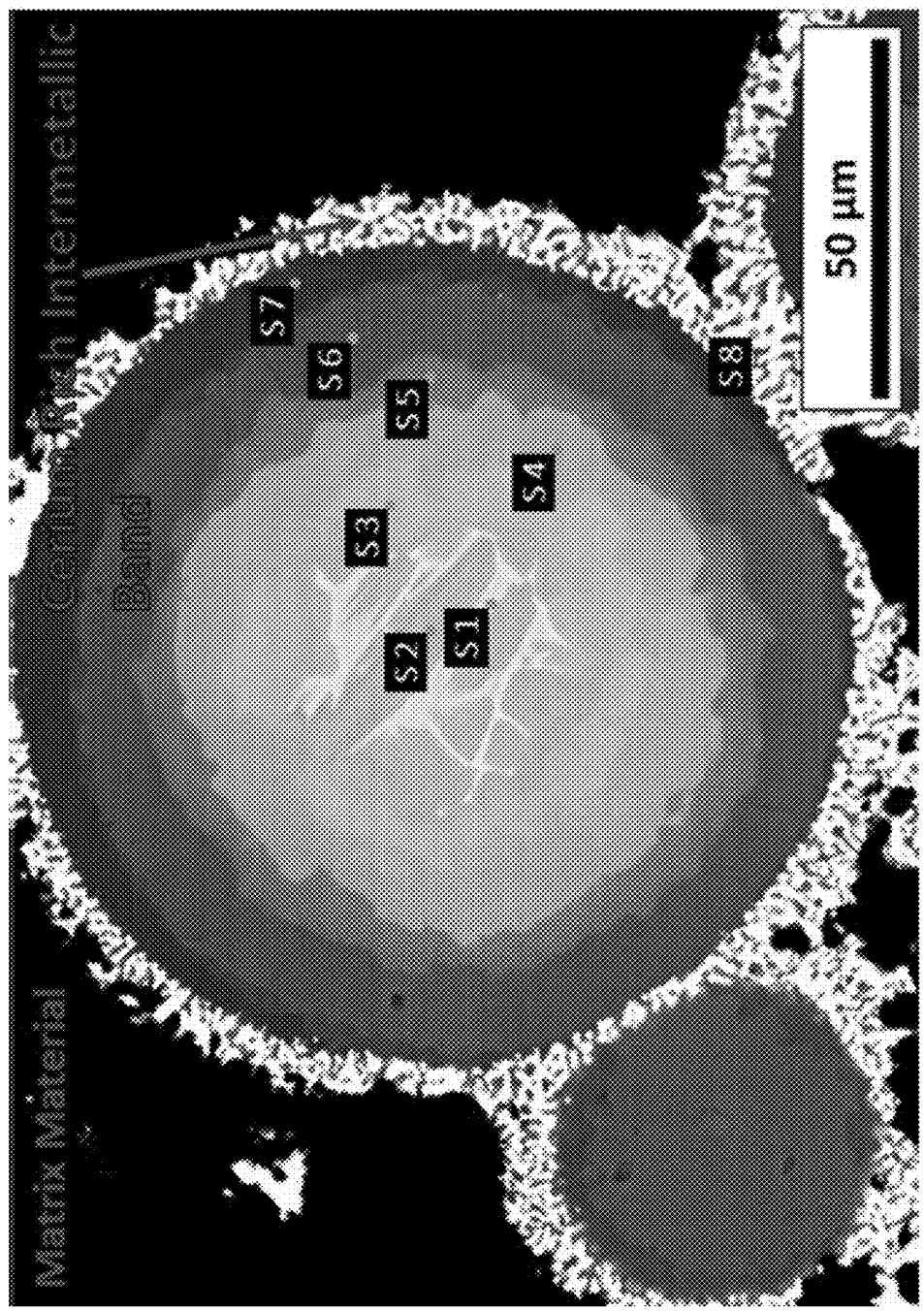
FIG. 27 is an energy-dispersive x-ray spectroscopy-scanning electron microscopy (EDS-SEM) image of the composite material of FIG. 24.

FIG. 27 shows an energy-dispersive x-ray spectroscopy (EDS) image of the composite material with labeled regions S1-S8. Table 2 shows the analysis results of each region. The structure is a core-shell structure with cerium showing limited diffusion capability when compared to aluminum in the titanium-rich particles. The shells become increasingly aluminum rich farther from the particle center due to the matrix infiltrant.

TABLE 2

| Region | Al | Ti | V | Ce |
|---|---|---|---|---|
| S1 | 6.51 | 77.49 | 14.72 | 1.28 |
| S2 | 11.4 | 84.64 | 3.25 | 0.72 |
| S3 | 11.07 | 85.44 | 3.02 | 0.47 |
| S4 | 17.32 | 79.27 | 2.97 | 0.45 |
| S5 | 36.59 | 60.76 | 2.2 | 0.45 |
| S6 | 50.69 | 47.15 | 1.63 | 0.53 |
| S7 | 58.89 | 38.12 | 2.47 | 0.52 |
| S8 | 37.04 | 14.23 | 1.84 | 46.88 |

All amounts in wt %

Figure 28:
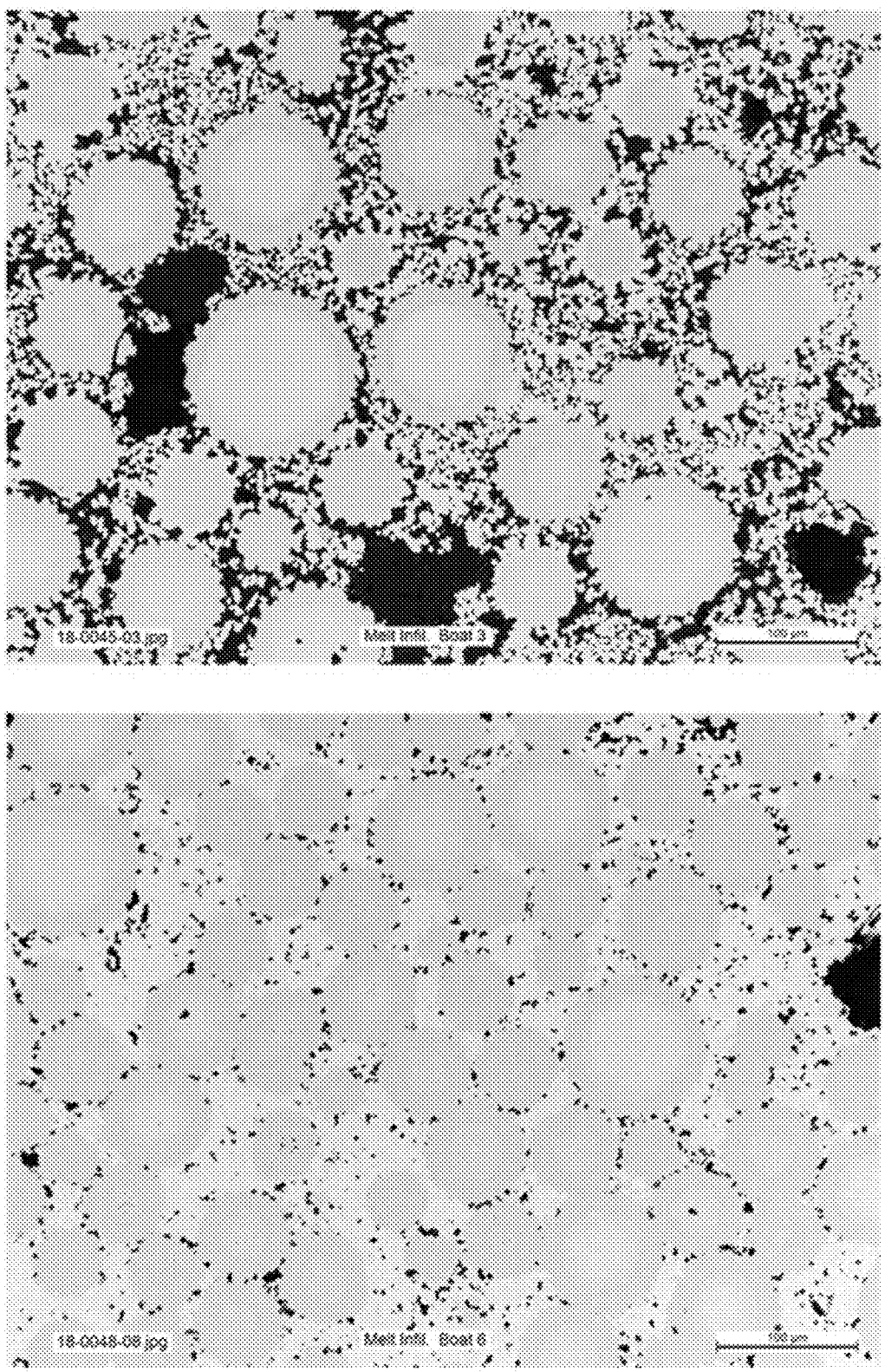
FIG. 28 shows a high-magnification image of the composite material of FIG. 23 (upper) and a high-magnification image of the composite material of FIG. 24 (lower).

FIG. 28 compares the results of infiltration in a one-step process with impeded infiltration through carbide formation (upper image) and a two-step process which promotes complete infiltration by reducing carbide formation (bottom image).

Figure 29:
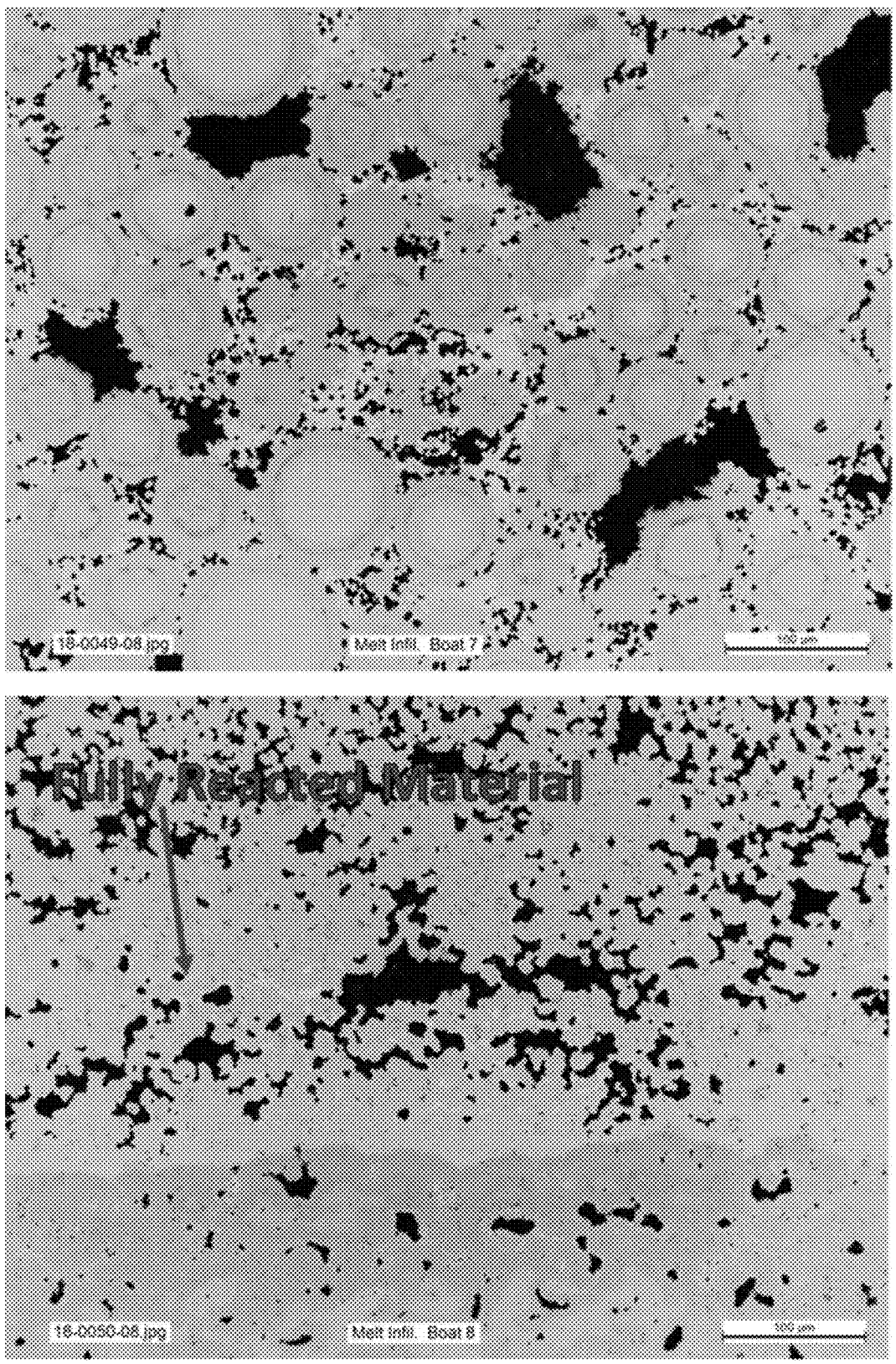
FIG. 29 shows high-magnification images of composite materials formed from large Ti-6Al-4V particles (upper image) and small Ti-6Al-4V particles (lower image).

The two-step process was repeated with Ti-6Al-4V powder particles of differing sizes. As shown in the upper image of FIG. 29, use of larger particles (50-125 µM) resulted in a distinct core-shell structure, whereas smaller particles (<20 µM) fully reacted with the matrix material (Al—Ce alloy) to form a new material largely devoid of particles (bottom image).

Figure 30:
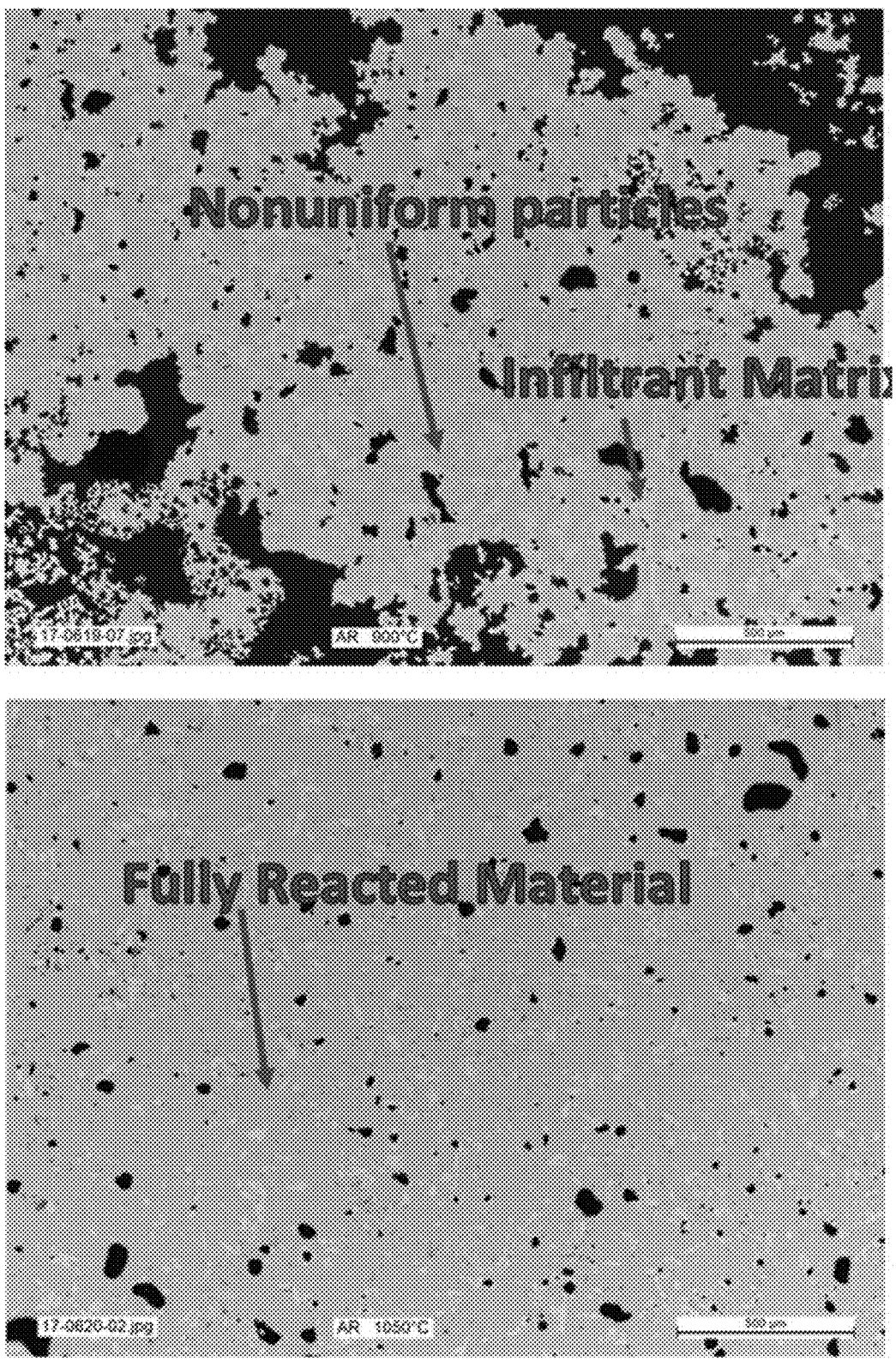
FIG. 30 shows high-magnification images of composite materials formed at a reaction temperature of 900° C. (upper image) and 1050° C. (lower image) when using non-spherical powder particles as the reinforcement material.

The two-step process was repeated with non-spherical Ti-6Al-4V powder particles at 900° C. or 1050° C. As shown in FIG. 30, the lower temperature resulted in a composite material comprising non-uniform particles (upper image), whereas the higher temperature resulted in fully-reacted material (lower image).

In view of the many possible embodiments to which the principles of the present disclosure may be applied, it should be recognized that the illustrated embodiments are only preferred examples and should not be taken as limiting the scope of the present disclosure.

Rather, the scope is defined by the following claims. We therefore claim as our invention all that comes within the scope and spirit of these claims.

We claim:

1. A composite material form, comprising:
a plurality of reinforcement material powder particles comprising a metal alloy or a ceramic, the reinforcement material powder particles having an aspect ratio of from 1 to 2;
a matrix material at least partially filling spaces between the reinforcement material powder particles, the matrix material comprising Al and Ce; and
at least one intermetallic phase surrounding one or more of the reinforcement material powder particles, the intermetallic phase including one or more elements of the reinforcement material powder particles, Al, and Ce, and wherein, the reinforcement material powder particle is ceramic, an average diameter of the ceramic reinforcement material powder particles is within a range of from 65 µm to 250 µm.

2. The composite material form of claim 1, wherein the reinforcement material comprises a Ti-Al-V alloy.

3. The composite material form of claim 1, wherein the reinforcement material comprises a first metal M1, and the reinforcement material powder particles and the intermetallic phase together comprise a gradient core-shell structure comprising:
  a gradient core comprising M1, Al, and Ce, and a plurality of intermetallic phases, the gradient core having a compositional gradient with a first average M1 concentration and a first average Ce concentration at a first average distance from a center of the gradient core, a second average M1 concentration and a second average Ce concentration at a second, further average distance from the center, wherein the second average M1 concentration is less than the first average M1 concentration; and
  a shell surrounding the gradient core, the shell comprising an average Ce concentration at least 5-fold greater than the second average Ce concentration.

4. The composite material form of claim 3, wherein M1 comprises Ti.

5. The composite material form of claim 1, wherein the reinforcement material powder particles are spherical.

6. A composite material form, comprising:
  a plurality of spherical reinforcement material powder particles comprising a metal alloy or a ceramic;
  a matrix material at least partially filling spaces between the spherical reinforcement material powder particles, the matrix material comprising Al and Ce; and
  at least one intermetallic phase surrounding one or more of the spherical reinforcement material powder particles, the intermetallic phase including one or more elements of the spherical reinforcement material powder particles, Al, and Ce.

7. A method, comprising:
  contacting a surface of a preform comprising a plurality of reinforcement material powder particles having an initial average diameter and an aspect ratio of from 1 to 2 with a molten infiltrant at a temperature $T_1$, wherein $T_1$ is greater than a melting point of the molten infiltrant and less than a melting point of the reinforcement material powder particles, the molten infiltrant comprising an aluminum-cerium (Al-Ce) alloy and the reinforcement material powder particles comprising a metal alloy or a ceramic, whereby the molten infiltrant at least partially fills spaces between the reinforcement material powder particles by capillary action and reacts with the reinforcement material powder particles to form a composite material form, the composite material form comprising a matrix material comprising the Al-Ce alloy and at least one intermetallic phase comprising at least one element of the reinforcement material powder particles, Al, and Ce, the matrix material at least partially filling the spaces between the reinforcement material powder particles and the at least one intermetallic phase surrounding one or more of the reinforcement material powder particles; and
  cooling the composite material form to a temperature $T_2$ less than a melting point of the molten infiltrant, and wherein, when the reinforcement material powder particle is ceramic, an average diameter of the ceramic reinforcement material powder particles is within a range of from 65 µm to 250 µm.

8. The method of claim 7, wherein the composite material form further comprises reinforcement material powder particles having a final average diameter, wherein the final average diameter is less than the initial average diameter.

9. The method of claim 7, wherein the preform is maintained at a temperature greater than the melting point of the molten infiltrant while contacting the surface of the preform with the molten infiltrant.

10. The method of claim 7, wherein the preform is a bonded powder preform comprising the reinforcement material powder particles and a binder, the method further comprising:
  heating the bonded powder preform to a temperature $T_3$, wherein $T_3$ is effective to decompose the binder and $T_3$ is less than a melting point of the reinforcement material powder particles and less than a melting point of the molten infiltrant, thereby decomposing the binder and producing the preform, the preform having spaces between the reinforcement material powder particles; and
  subsequently contacting the surface of the preform with molten infiltrant at the temperature $T_1$.

11. The method of claim 10, further comprising forming the preform using binder jet technology.

12. The method of claim 7, wherein contacting the surface of the preform with the molten infiltrant comprises dipping the surface of the preform into the molten infiltrant.

13. The method of claim 7, further comprising subsequently heating the composite material form to a temperature $T_4$, whereby the matrix material reacts further with the reinforcement material powder particles to form additional intermetallic.

14. The method of claim 7, wherein the Al-Ce alloy comprises from 5 wt % to 20 wt % Ce with the balance being Al.

15. The method of claim 7, wherein the reinforcement material powder particles constitute 50% (v/v) of the preform.

16. The method of claim 1, wherein when the reinforcement material powder particle is metal alloy, an average diameter of the metal alloy reinforcement material powder particles is within a range of from 20 µm to 250 µm.

17. The method of claim 7, wherein the reinforcement material powder particles comprise a first metal M1, and the composite material form comprises one or more gradient core-shell structures, the gradient core-shell structure comprising:
  a gradient core comprising M1, Al, and Ce, and a plurality of intermetallic phases, the gradient core having a compositional gradient with a first average M1 concentration and a first average Ce concentration at a first average distance from a center of the gradient core, a second average M1 concentration and a second average Ce concentration at a second, further average distance from the center, wherein the second average M1 concentration is less than the first average M1 concentration; and
  a shell surrounding the gradient core, the shell comprising an average Ce concentration at least 5-fold greater than the second average Ce concentration.

18. The method of claim 7, wherein the reinforcement material powder particles comprise a metal alloy.

19. The method of claim 18, wherein the metal alloy comprises a titanium alloy, a nickel alloy, a copper alloy, an iron alloy, steel, an aluminum alloy, a high-entropy alloy, or any combination thereof.

20. The method of claim 19, wherein the metal alloy is a Ti-Al-V alloy.

21. A method, comprising:
contacting a binder jet preform comprising a plurality of reinforcement material powder particles and a binder with an infiltrant comprising an Al-Ce alloy, the reinforcement material powder particles comprising a metal alloy and having an aspect ratio of from 1 to 2;
heating the binder jet preform to a temperature greater than a decomposition temperature of the binder, wherein the temperature is less than a melting point of the infiltrant, thereby decomposing the binder and producing a preform having spaces between the reinforcement material powder particles;
increasing the temperature to a temperature greater than a melting point of the infiltrant, whereby the infiltrant fills the spaces between the reinforcement material powder particles by capillary action and reacts with the reinforcement material powder particles to produce a composite material form comprising a matrix material comprising the Al-Ce alloy and at least one intermetallic phase comprising at least one element of the reinforcement material powder particles, Al, and Ce, the matrix material at least partially filling the spaces between the reinforcement material powder particles and the at least one intermetallic phase surrounding one or more of the reinforcement material powder particles; and
cooling the composite material form to a temperature less than a melting point of the infiltrant.

22. The method of claim 21, wherein the reinforcement material comprises a Ti-Al-V alloy.

23. The method of claim 21, wherein heating the binder jet preform to the temperature greater than the decomposition temperature of the binder is performed under a non-reactive gas.

24. The method of claim 21, further comprising subsequently heating the form to an effective temperature for reaction of the infiltrant with the reinforcement material powder particles.

* * * * *

UNITED STATES PATENT AND TRADEMARK OFFICE
CERTIFICATE OF CORRECTION

PATENT NO. : 11,565,318 B2
APPLICATION NO. : 17/011316
DATED : January 31, 2023
INVENTOR(S) : Rios et al.

It is certified that error appears in the above-identified patent and that said Letters Patent is hereby corrected as shown below:

On the Title Page

Item (71), "Orlando Rios, Craig A. Bridges, Amelia M. Elliott, Hunter B. Henderson, Michael S. Kesler, Zachary C. Sims, and David Weiss" should read --UT Battelle, LLC, University of Tennessee Research Foundation, and Eck Industries Incorporated--.

Signed and Sealed this
Third Day of October, 2023

Katherine Kelly Vidal
*Director of the United States Patent and Trademark Office*